(12) United States Patent
Sato et al.

(10) Patent No.: US 6,501,563 B1
(45) Date of Patent: Dec. 31, 2002

(54) IMAGE PROCESSING APPARATUS

(75) Inventors: Tsuneo Sato, Tokyo (JP); Masayuki Saito, Tokyo (JP); Kenji Tominaga, Tokyo (JP); Tomoki Yoshimura, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/296,523

(22) Filed: Apr. 22, 1999

(30) Foreign Application Priority Data

Dec. 11, 1998 (JP) .......................................... 10-353473

(51) Int. Cl.[7] .......................... G06F 13/00; G03F 3/08; G06K 9/00
(52) U.S. Cl. ...................... 358/1.9; 358/520; 382/167
(58) Field of Search ......................... 358/518, 1.9, 520, 358/515, 523, 524; 382/162, 167

(56) References Cited

U.S. PATENT DOCUMENTS

| | | | | |
|---|---|---|---|---|
| 4,719,584 A | * | 1/1988 | Rue et al. ................... 364/516 |
| 5,191,409 A | * | 3/1993 | Hamaguchi et al. .......... 358/75 |
| 5,414,448 A | * | 5/1995 | Wada et al. ................. 345/194 |
| 5,428,397 A | * | 6/1995 | Lee et al. ................... 348/448 |
| 5,761,342 A | * | 6/1998 | Yoshida ....................... 382/234 |
| 5,786,906 A | * | 7/1998 | Shishizuka .................. 358/500 |
| 5,883,976 A | * | 3/1999 | Ohsawa ...................... 382/232 |

FOREIGN PATENT DOCUMENTS

| JP | 58198969 | 11/1983 |
|---|---|---|
| JP | 61273073 | 12/1986 |
| JP | 3175876 | 7/1991 |

* cited by examiner

*Primary Examiner*—Madeleine Nguyen
(74) *Attorney, Agent, or Firm*—Birch, Stewart, Kolasch & Birch, LLP

(57) ABSTRACT

A judgement section (10) and a ratio calculation section (11) in an image processing apparatus input image signals in digital form of n color components forming colors, transferred externally in time series, and calculate conversion parameters indicating change of ratios of signal strength values between input image signals per color component based on a total sum of the ratios of synthesis signal values, each conversion section (12, 13, 14) and a signal range calculation section (15) converts input image signals to output image signal without any change of the ratio of signal strength values between the input image signals based on the conversion parameters, per color component.

12 Claims, 14 Drawing Sheets

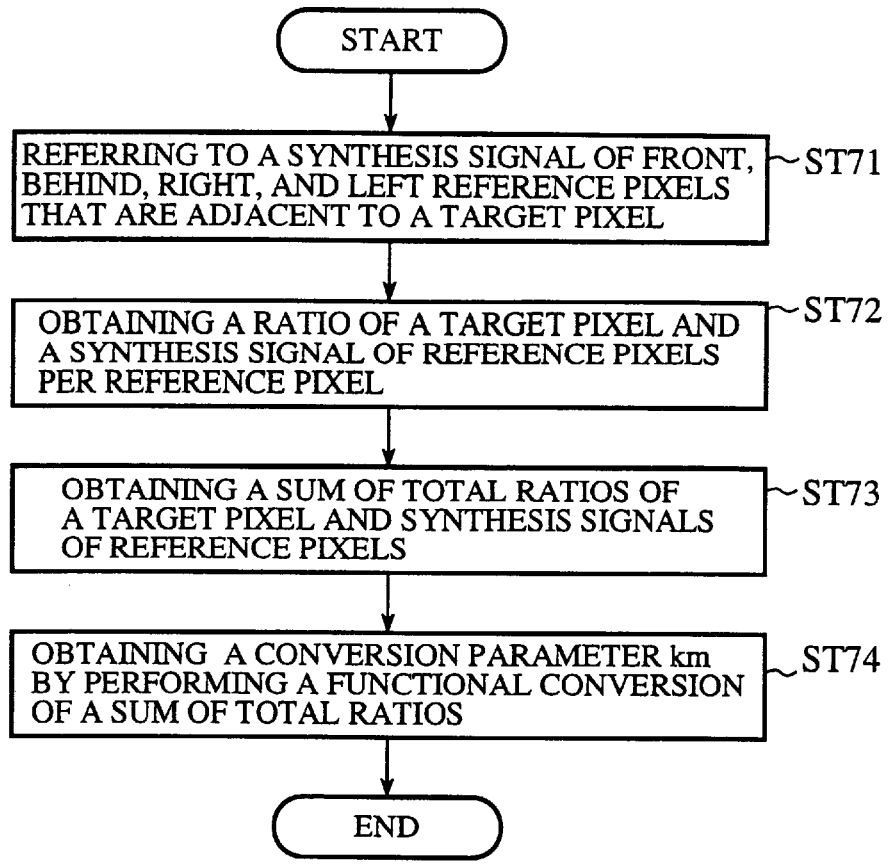
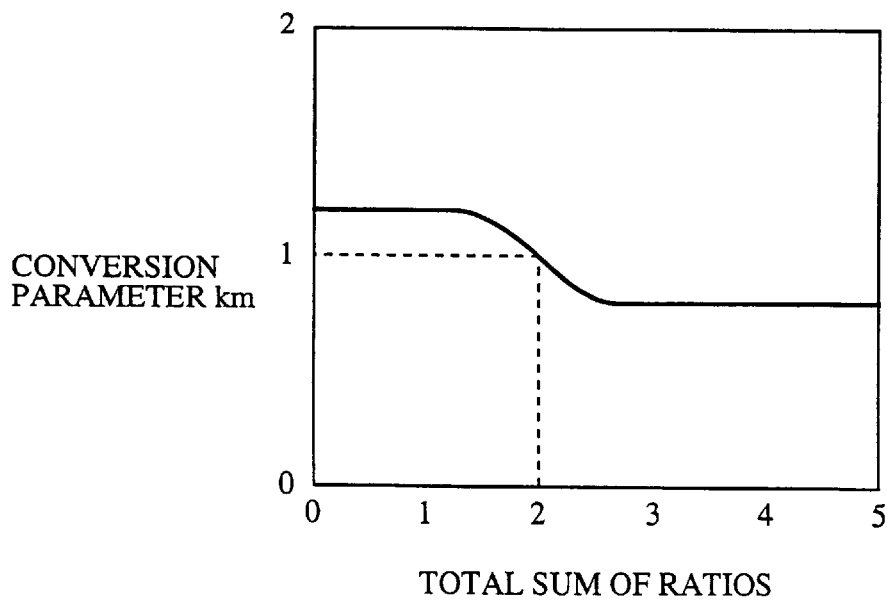

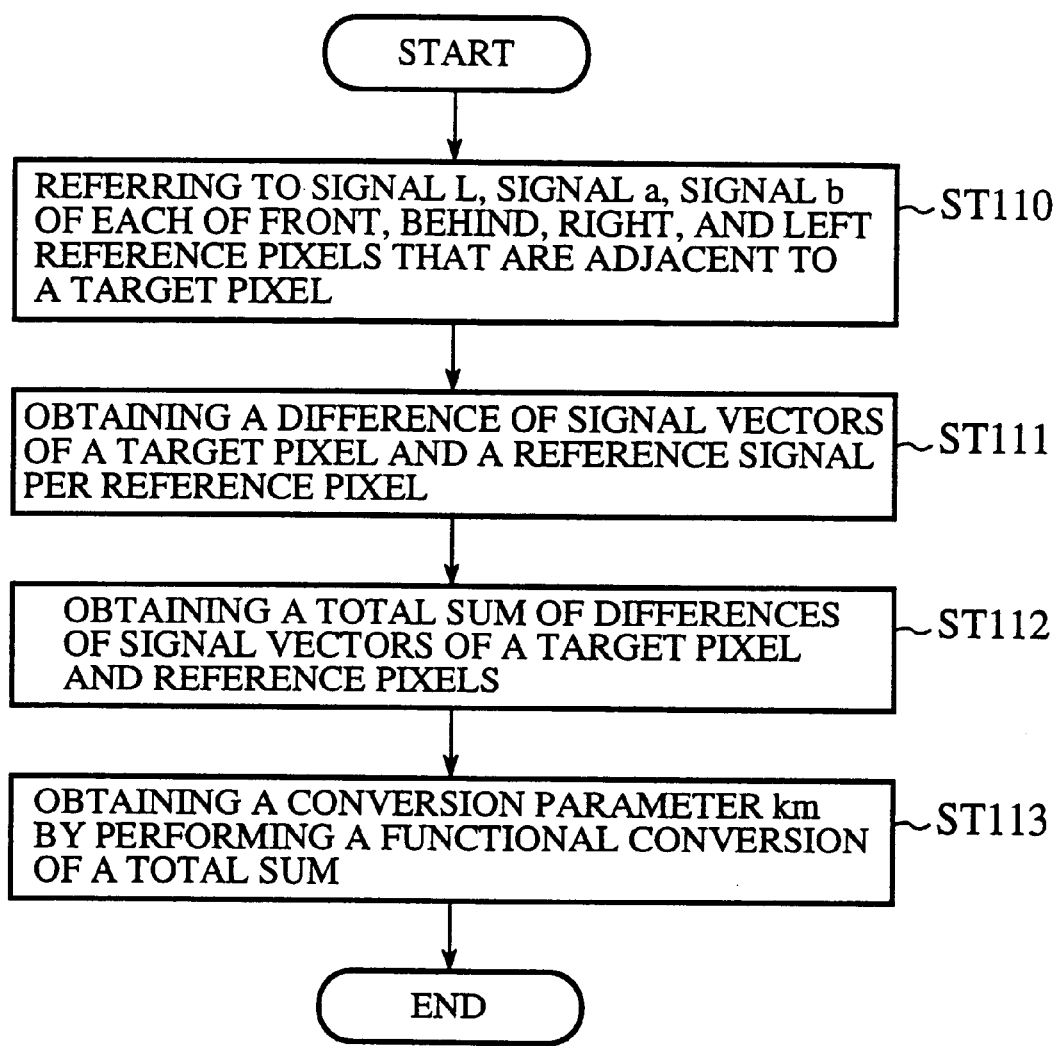

IMAGE PROCESSING APPARATUS

BACKGROUND OF THE INVENTION

1. Field of the Invention

The present invention relates to an image processing apparatus capable of suppressing the change of hue of color image signals as image data transferred from external devices and also capable of increasing a sharpness of outlines or boundaries of the image data.

2. Description of the Related Art

CONVENTIONAL EXAMPLE 1

FIG.1 is a block diagram showing a configuration of a conventional image processing apparatus disclosed in a patent document whose laid-open publication number is JP-A-58/198969, "Method of sharpness for image". In FIG. 1, the reference character S0 designates a sharp signal and U0 denotes un-sharp signal. The reference number 141 designates a subtracter. The subtracter 141 inputs both the sharp signal S0 and un-sharp signal U0 to calculate a difference (S0–U0) between both signals S0 and U0. A multiplier 142 inputs the difference from the subtracter 141. The multiplier 142 multiplies the difference (S0–U0) by a constant value k. A multiplier 143 inputs the result of the multiplication of the multiplier 142.

Next, a divider 144 inputs an image signal I0 and an image signal Ii. In order to obtain a sharpness highlighting signal, the divider 144 performs a division of image signals I0 and Ii and outputs a divisional result I0/Ii. The multiplier 143 inputs the result I0/Ii from the divider 144 and performs a multiplication of the result k(S0–U0) and the result I0/Ii. An adder 145 inputs both the image signal Ii and the result k(S0–U0) (I0/Ii) and adds them and outputs the result Ii' of the addition. That is, the image signal Ii' obtained by the sharpness processing can be expressed by the following equation (1):

$$I'_i = I_i + \frac{I_i}{I_0} \times K \times (S_0 - U_0). \tag{1}$$

CONVENTIONAL EXAMPLE 2

FIG. 2 is a block diagram showing a configuration of a conventional another image processing apparatus disclosed in the patent document whose laid-open publication number is JP-A-61/273073, "Edge highlighting processing apparatus for color gradation image information". In FIG. 2, the reference number 151 designates a RGB/brightness conversion unit, 152 denotes a RGB/YMC conversion unit, 153 indicates a multiplexer, and 154 designates an outline highlighting unit.

Both the RGB/brightness conversion unit 151 and the RGB/YMC conversion unit 152 input digital signals R, G, and B. The RGB/brightness conversion unit 151 outputs a brightness I. This brightness I can be expressed by the following equation (2).

$$I = 0.30 \times R + 0.59 \times G + 0.11 \times B \tag{2}$$

On the other hand, the RGB/YMC conversion unit 152 performs only a complementary operation because R and G, B and Y, M and C are in a complementary color relationship, respectively.

The multiplexer 153 inputs an output as a result from the RGB/YMC conversion unit 152. The multiplexer 153 selects and outputs only one of three kinds of information Y, M, and C supplied from the RGB/YMC conversion unit 152 through input terminals of the multiplexer 153 according to a state of selection terminals. The outline highlighting unit 154 inputs the selected one, namely the YMC signal, from the multiplexer 153 through an input terminal of the outline highlighting unit 154. The outline highlighting unit 154 further inputs the brightness I from the RGB/brightness conversion unit 151. The brightness signal I is delayed per pixel according to a clock signal and then converted to intermediate data D1 that will be expressed by the following equation (3).

$$D1 = 2I_n - (I_{n+1} + I_{n-1}) \tag{3}$$

where $I_n$ is a brightness I of the n-th pixel.

The intermediate data designate a result of an edge extraction operation. For example, the intermediate data D1 becomes 0 when the brightness I is not changed, and becomes a negative value or a positive value when the brightness I is changed.

Next, the intermediate data D1 are converted into a complementary coefficient D2 with reference to a table showing a relationship between edge extraction results and complementary coefficients. In the table showing the relationship between the edge extraction results and the complementary coefficients, the value 1 is set when the edge extraction result is 0, and the value is in 0 and 1 when the edge extraction result is a negative value, and the value is not less than 1 when the edge extraction result is a positive value. The final result can be expressed by the following equation (4) when the complementary coefficients D2 is multiplied by selected YMC signal.

$$O = \begin{cases} Y \times D2 \\ M \times D2 \\ C \times D2 \end{cases} \tag{4}$$

CONVENTIONAL EXAMPLE 3

FIG. 3 is a diagram showing the operation flow of an image processing method executed by another conventional image processing apparatus disclosed in the patent document whose laid-open publication number is JP-A-3/175876, "Edge processing method for color images". In the conventional image processing method shown in FIG. 3, the color information obtained by scanning color documents by an image device are divided or resolved into a red component, a green component, and a blue component. Each of the red, blue, and green components is scanned per pixel and sampled. Finally, the sampled image information are used as input image data (R1, G1, B1).

The input image data R1, G1, and B1 are converted to three stimulus values X1, Y1, and Z1 for a target pixel and adjacent pixels that are adjacent to the target pixel in a specific pixel area (Step ST161).

Then, a CIE color coordinate x1 and y1 and a visual reflection factor Y1 are obtained based on the three stimulus values X1, Y1, and Z1 (Step ST162). A sharpness processing for the visual reflection factor Y1 is performed (Step ST163) by using the Laplacian filter, that is well known, in order to obtain the three stimulus values X2, Y2, and Z2 based on the CIE color coordinate x1 and y1 and the visual reflection factor Y2. Then, the three stimulus values X2, Y2, and Z2 are calculated by using the CIE color coordinate x1 and y1 and the visual reflection factor Y2 that has been obtained by the edge processing (Step ST164).

Finally, the three stimulus values X, Y2, and Z2 are converted to the image information R2, G2, and B2 (Step ST165) and those image information R2, G2, and B2 are then outputted as output image data to external image devices (not shown).

A concrete example for the above image processing will be explained.

In Step ST161, the input image information R1, G1, and B1 are converted based on the following equation (5).

$$\begin{pmatrix} X1 \\ Y1 \\ Z1 \end{pmatrix} = \begin{pmatrix} 0.6067 & 0.1736 & 0.2001 \\ 0.2988 & 0.5868 & 0.1144 \\ 0.0 & 0.0661 & 1.1150 \end{pmatrix} \begin{pmatrix} R1 \\ G1 \\ B1 \end{pmatrix}. \quad (5)$$

At Step ST162, the CIE color coordinate x1, y1 and the visual reflection factor Y1 are calculated based on the following equations (6) and (7), respectively.

$$x1 = \frac{X1}{X1+Y1+Z1} \quad (6)$$
$$y1 = \frac{Y1}{X1+Y1+Z1},$$

$$\text{Visibility}=Y1 \quad (7)$$

In Step ST163, the sharpness processing is performed by using the Laplacian filter. In this sharpness processing, when the visibility of a target pixel is Y1, and when the visibilities of adjacent pixels that are located at front, behind, right, and left pixels adjacent to the target pixel are Yb, Yc, Yd, and Ye, respectively, the degree "Parm" of the sharpness can be expressed by the following equation (8).

$$Y2=Y1-\text{Parm}\times(Yb+Yc+Yd+Ye-(4\times Y1)) \quad (8).$$

In Step ST164, the three stimulus values X2, Y2, and Z2 are calculated by using the CIE color coordinate x1 and y1 and the visual reflection factor Y2 that has been obtained by the edge processing. These three stimulus values X2, Y2, and Z2 are obtained by performing the inverse conversion function shown in the equation (6).

In Step ST165, the three stimulus values X2, Y2, and Z2 are converted to the image information R2, G2, and B2 by using the inverse function shown in the equation (5).

Because the conventional image processing apparatuses have the configurations and the functions described above, for example, the image processing apparatus as the conventional example 1 has a drawback that the sharpness of image is increased when the signal Ii is changed, but any sharpness of image is not changed or increased when the sharpness of image is not changed when the signal Ii is not changed and the change of color is changed. In addition, the conventional image processing apparatus requires to divide signals into a sharp signal and un-sharp signal. This causes to increase the processing time period. As a result, the total time period to perform image processing becomes long.

In addition, because the calculation for the brightness I is executed based on the equation (2) described above in the conventional image processing apparatus as the conventional example 2, there is a drawback that it is difficult to realize the function on a hardware.

Furthermore, because the three stimulus values are calculated based on the equation (5) described above in the color image edge processing method executed by the conventional image processing apparatus as the conventional example 3, there is a drawback that it is also difficult to realize the function on a hardware.

SUMMARY OF THE INVENTION

Accordingly, an object of the present invention is, with due consideration to the drawbacks of the conventional technique, to provide an image processing apparatus, that may easily been made on a hardware, capable of judging a change of input image signals between a target pixel and peripheral pixels adjacent to the target pixel based on a difference of signal strengths of them and also capable of highlighting a ratio of the change of input image signals with suppressing the change of hue of the input image signals.

In accordance with a preferred embodiment of the present invention, an image processing apparatus has judgement means and conversion means. The judgement means inputs input image signals of n color components (n is a positive integer not less than three) forming colors of a plurality of image pixels transferred from an external device in time series, calculates a synthesis signal value of a target image pixel per input color component in said input image signals by performing a division of a sum of signal strength values of said input image signal about said target image pixel by a value of the n-th power of 2, and calculates a synthesis signal value of reference image pixels per color component in said input image signals by performing a division of a sum of signal strength values of said input image signals about said reference image pixels adjacent to said target image pixel by using the value of the n-th power of 2, calculates a ratio of said synthesis signal values of each reference image pixel and said target image pixel per reference image pixel, and calculates a conversion parameter indicating a change rate of signal strength values of said input image signals per color component based on a total sum of said ratios of said synthesis signal values. The conversion means converts said input image signals to output image signals without a change of a ratio of signal strength values between said input image signals per n-color component based on said conversion parameter per color component obtained by said judgement means. Accordingly, this configuration and function of the image processing apparatus achieves to suppress any change of hue of the input image signals and to highlight a part of change of color of the input image signals, and to form the image processing apparatus on a hardware easily.

In the image processing apparatus as another preferred embodiment according to the present invention, said judgement means selects input image signals as one color component in said input image signals forming said n color components, calculates a sum of signal strength values of said input image signals about said target image pixel as said synthesis signal value of said target image pixel per selected input image signals, calculates a sum of signal strength values of said input image signals about said reference image pixels as said synthesis signal value of said reference image pixels per selected input image signals, then calculates said ratio of said synthesis signal values of said target image pixel and said reference image pixel per reference image pixel, and calculates said conversion parameter indicating the change of the signal strength value of said input image signals of said selected color component based on said total sum of said synthesis signal values. Further, in the image processing apparatus above, said conversion means converts said input image signals without a change of said ratio of said signal strength values between said input image signals based on said conversion parameter per color component obtained by said judgement means. Accordingly, this configuration and function of the image processing apparatus achieves to suppress any change of hue of the input image signals and to highlight a part of change of color of the input image signals, and to form the image processing apparatus on a hardware easily.

The image processing apparatus as another preferred embodiment according to the present invention, further comprises signal range calculation means for setting a signal strength value of said output image signal outputted from said conversion section as a new upper limit value when said signal strength value of said output image signal is over a predetermined value, and for re-calculating said signal strength value of said output image signal transferred from said conversion means without any change of said ratio of said signal strength values among said input image signals of said n color components (n is a positive integer not less than three), and for outputting re-calculated output image signals.

In accordance with another preferred embodiment of the present invention, an image processing apparatus has coordinate conversion means, judgement means, conversion means and reverse conversion means. The coordinate conversion means inputs input image signals of n color components (n is a positive integer not less than three) forming colors of a plurality of image pixels transferred from an external device in time series, converts said input image signals to brightness signals, chromaticness signals, and hue signals. The judgement means inputs said brightness signals, said chromaticness signals, and said hue signals transferred from said coordinate conversion means, calculates a ratio of a change of said input image signals among a target pixel and reference pixels adjacent to said target pixel by using a difference of vectors per brightness signal, chromaticnes signal, and hue signal, and calculates a total sum value of said differences of said vectors, and for calculating a conversion parameter per brightness signal, chromaticness signal, and hue signal by calculating an inner product of said total sum value and an unit vector of each of said brightness signals, said chromaticness signals, and said hue signals. The conversion means converts said brightness signals, said chromaticness signals, and said hue signals without a change of a ratio of signal strength values between said brightness signals, said chromaticness signals, and said hue signals based on said conversion parameters per brightness signal, chromaticnes signal, and hue signal. The reverse converting means converts said brightness signals, said chromaticness signals, and said hue signals outputted from said conversion means to output image signals of n color components forming colors. Accordingly, this configuration and function of the image processing apparatus achieves to suppress any change of hue of the input image signals and to highlight a part of change of color of the input image signals, and to form the image processing apparatus on a hardware easily.

In the image processing apparatus as another preferred embodiment according to the present invention, said judgement means calculates said conversion parameters indicating a change rate of the brightness signals by calculating a ratio of the brightness signals between said target pixel and said reference pixels per reference pixel and calculating the total sum of said ratios of said brightness signals, and wherein said conversion means converts said brightness signals, said chromaticness signals, and said hue signals without a change of said ratio of said signal strength values between said brightness signals based on said conversion parameters per brightness signal. Accordingly, this configuration and function of the image processing apparatus achieves to suppress any change of hue of the input image signals and to highlight a part of change of color of the input image signals, and to form the image processing apparatus on a hardware easily.

In the image processing apparatus as another preferred embodiment according to the present invention, the judgement means calculates said conversion parameters within a range of a lower limit value to an upper limit value for said conversion parameters.

BRIEF DESCRIPTION OF THE DRAWINGS

These and other objects, features, aspects and advantages of the present invention will become more apparent from the following detailed description of the present invention when taken in conjunction with the accompanying drawings, in which:

FIG. 10 is a flow chart showing the operation of the judgement section 60 in the image processing apparatus 2 shown in FIG. 9;

FIG. 11 is a diagram showing a function "f" that indicates a relationship between a total sum Pm, that is a total sum of ratios of synthesis signals between a target pixel and reference pixels about a pixel m, and a conversion parameter Km;

FIG. 14 is a flow chart showing the operation of the judgement section 101 in the image processing apparatus 4 shown in FIG. 13;

DESCRIPTION OF THE PREFERRED EMBODIMENTS

Other features of this invention will become apparent through the following description of preferred embodiments which are given for illustration of the invention and are not intended to be limiting thereof.

First Embodiment

Figure 1:
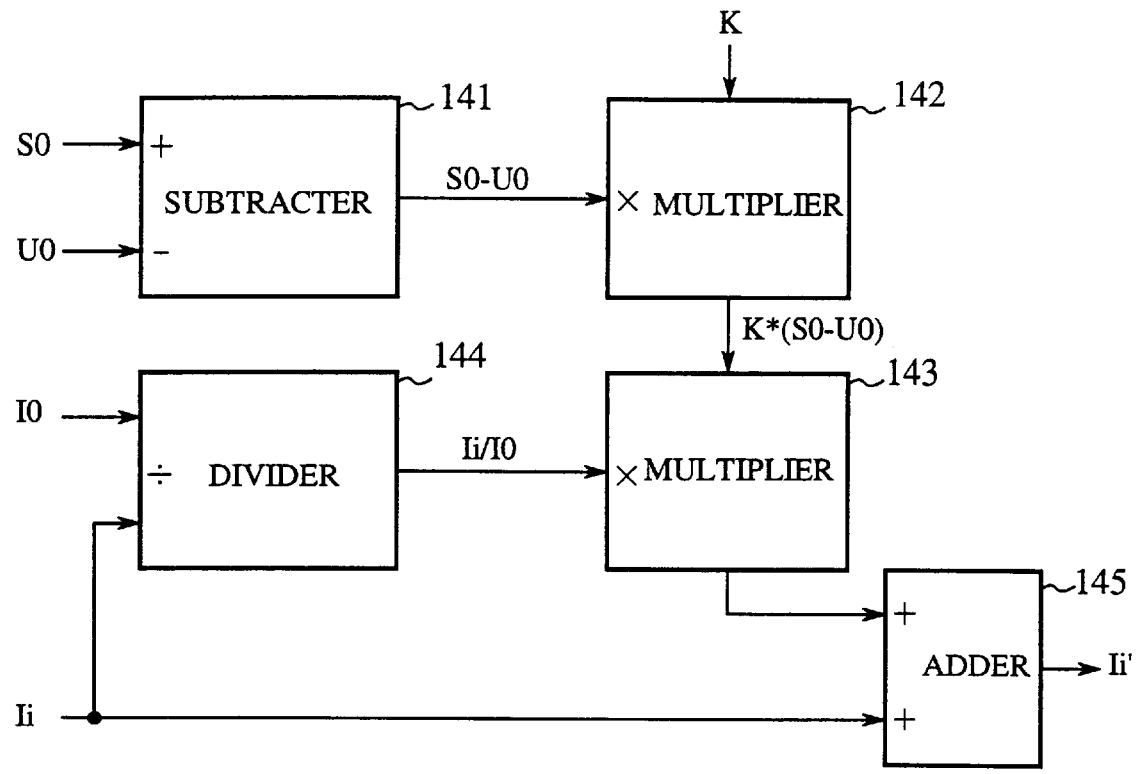
FIG. 1 is a block diagram showing a configuration of a conventional image processing apparatus.
Figure 2:
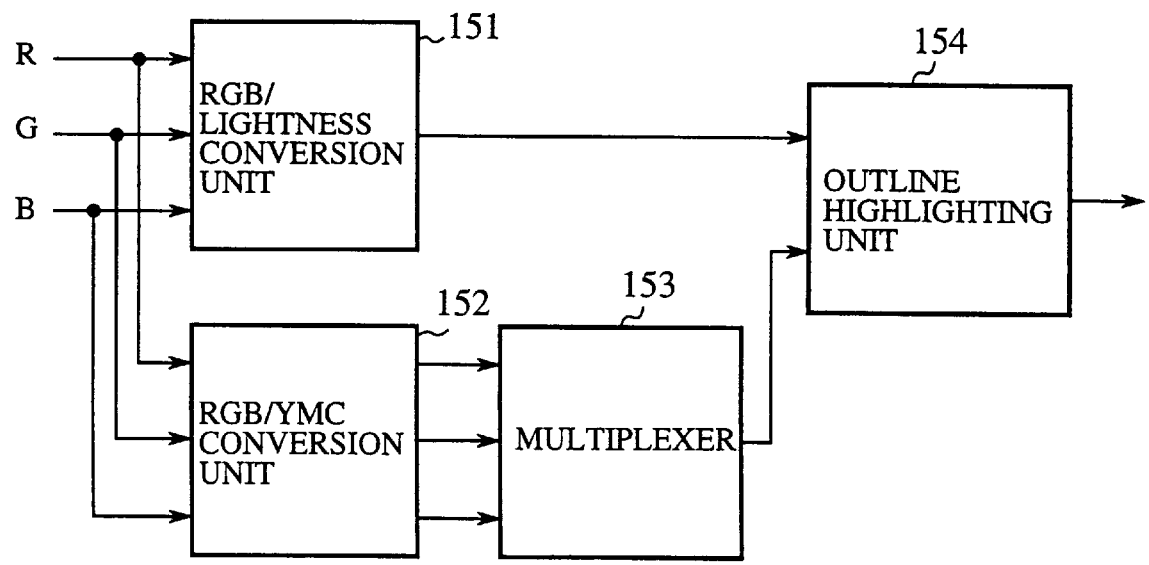
FIG. 2 is a block diagram showing another configuration of a conventional image processing apparatus.
Figure 3:
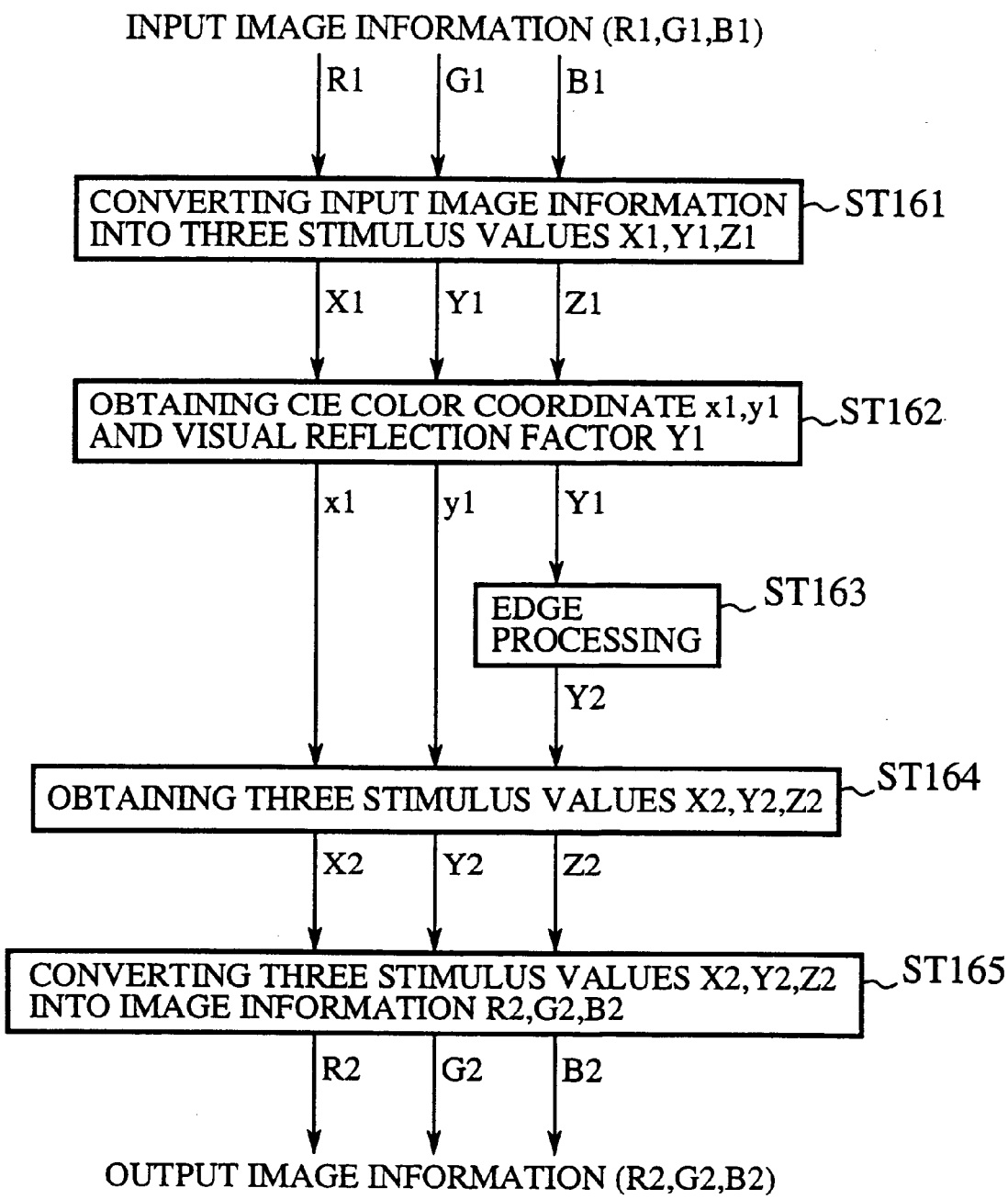
FIG. 3 is a diagram showing a procedure of an image processing method performed by a conventional image processing apparatus.
Figure 4:
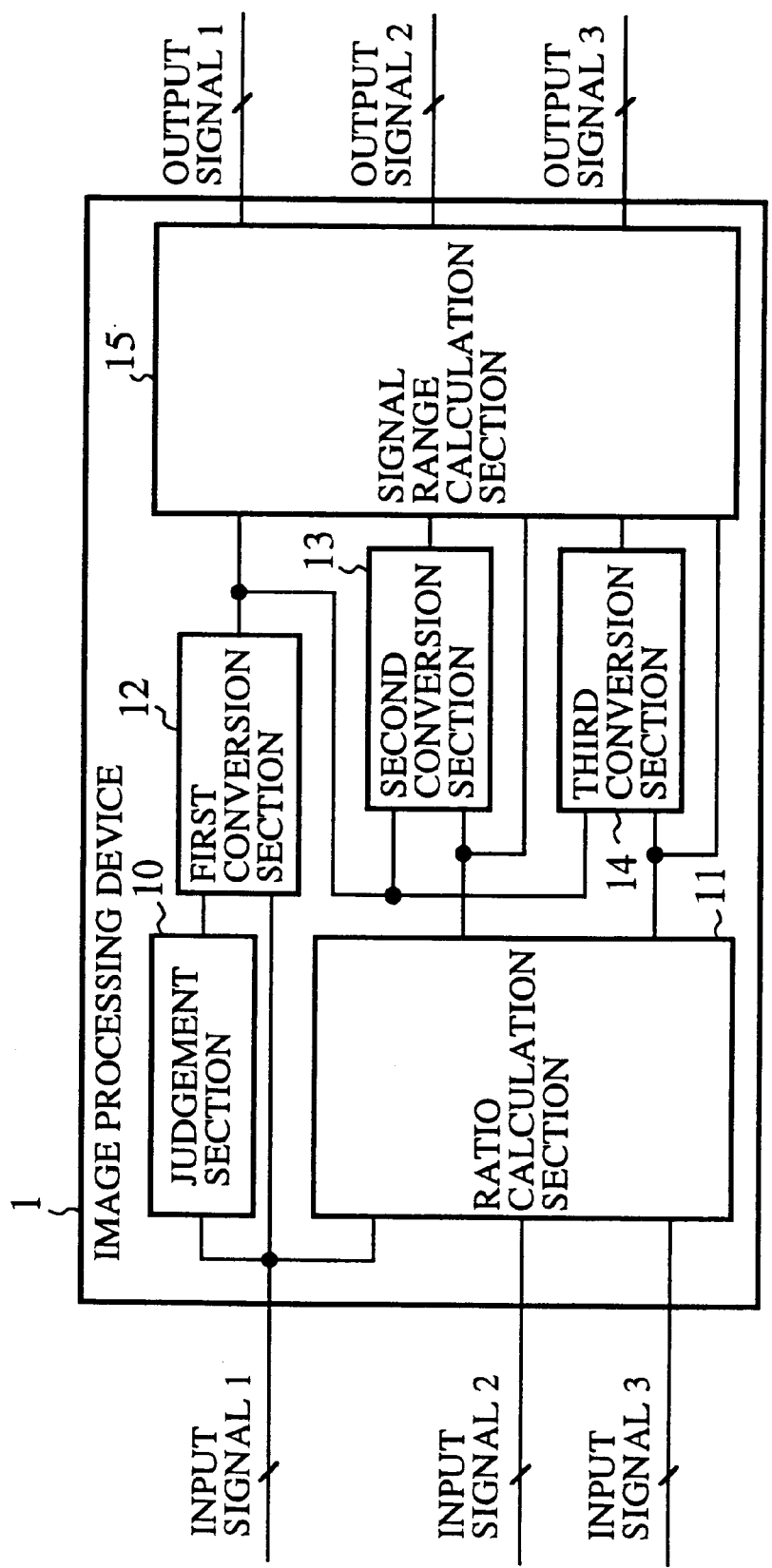
FIG. 4 is a block diagram showing a configuration of the image processing apparatus as the first embodiment according to the present invention.

FIG. 4 is a block diagram showing a configuration of an image processing apparatus as the first embodiment according to the present invention. In FIG. 4, the reference number 1 designates the image processing apparatus, 10 denotes a judgement section for judging a relationship between adjacent pixels in each of input signals 1, 2, and 3. The reference number 11 designates a ratio calculation section for calculating a relationship among the input image signal 1, 2, and 3. The reference number 12 denotes a first conversion section for receiving an output signal transferred from the judgement section 10 and for converting the input image signal 1 based on the received output signal from the judgement section 10. The reference numbers 13 and 14 denote second conversion section and third conversion section, respectively, for receiving output signals from both the first conversion section 12 and the ratio calculation section 11. Further, the second conversion section 13 and third conversion section 14 convert the input image signal 2 and the input image signal 3, respectively, based on the output signals from both the first conversion section 12 and the ratio calculation section 11. The reference number 15 designates a signal band calculation section for re-calculating the output signal from each of the first, second, and third conversion sections 12, 13, and 14 based on the relationship among those output signals and a pre-determined signal band. In this case, the signal band means a range between the maximum value (or a upper limit value) and the minimum value (or a lower limit value) of each of the input image signals 1, 2, and 3.

Thus, the image processing apparatus 1 as the first embodiment shown in FIG. 4 has the judgement section 10, the ratio calculation section 11, the first conversion section 12, the second conversion section 13, the third conversion section 14, and the signal band calculation section.

In the image processing apparatus shown in FIG. 4, the input image signal 1, the input image signal 2, and the input image signal 3 are digital signals transferred from external image devices (not shown) such as a digital camera, a monitor, a printer, and so on. As a concrete example, each of the input image signals 1, 2, and 3 is a RGB digital signal, or a CMY digital signal. It is also acceptable to increase the number of input signals, for example, more than three. Each of the input image signals 1, 2, and 3 is a digital signal transferred from the external image devices (omitted from drawings) to the image processing apparatus 1 through 8 bit signal lines, 16 bit signal lines, or 32 bit signal lines.

The image processing apparatus 1 outputs output digital signals that have been obtained by processing the input image signals 1, 2, and 3 based on predetermined processes are transferred to the external image devices (omitted from the drawings) such as a digital camera, a monitor, a printer, and so on.

Each of the output image signals 1, 2, and 3 is a RGB signal or a CMY signal, and corresponding to each of the input image signals 1, 2, and 3, respectively. Like the input image signals 1, 2, and 3, it is also acceptable to increase the number of signal lines more than three through which the output image signals are outputted from the image processing apparatus to external devices (not shown). The bit number of each output signal is 8, 16, or 32 bits.

Next, a description will be given of the operation of the image processing apparatus 1 as the first embodiment.

Figure 5:
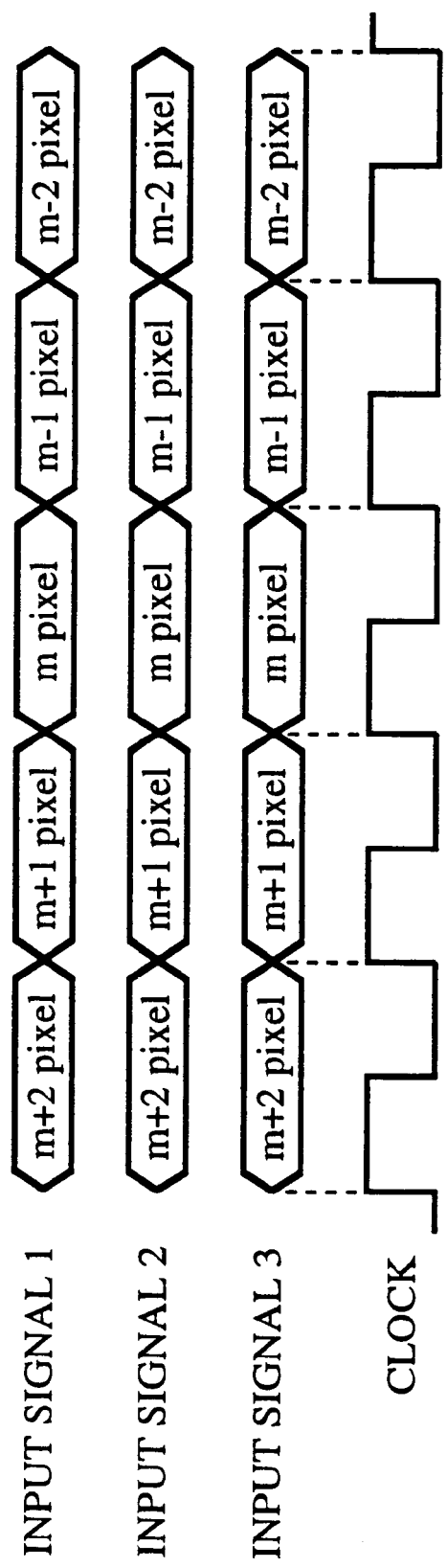
FIG. 5 is a timing chart showing each of input signals continuously transferred from external image devices to the image processing apparatus in time series.

FIG. 5 is a timing chart showing each of the input image signals 1, 2, and 3 continuously transferred from external image devices (not shown) to the image processing apparatus 1 in time series.

In FIG. 5, the input image signal n (n=1, 2, and 3) are digital image signals continuously transferred from external image devices (not shown) in time series. For example, three input image signals that have been transferred simultaneously show colors of pixels. The timing chart shown in FIG. 5 shows a relationship of transmission of the input image signal n. The clock signal shows time proceedings.

During one period consisting of a High (H) level and a following Low (L) level, the transmission of the input image signals for one pixel is completed. For example, at the time immediately before the transmission of input image signals of the m-th pixel, input image signals of the (m−1)th pixels are transferred and received by the image processing apparatus 1. Like this, in the time immediately following the transmission of input image signals of the m-th pixel, input image signals of the (m+1)th pixel are transferred continuously.

Next, the operation of the judgement section 10 in the image processing apparatus 1 shown in FIG. 4 will be explained.

Figure 6:
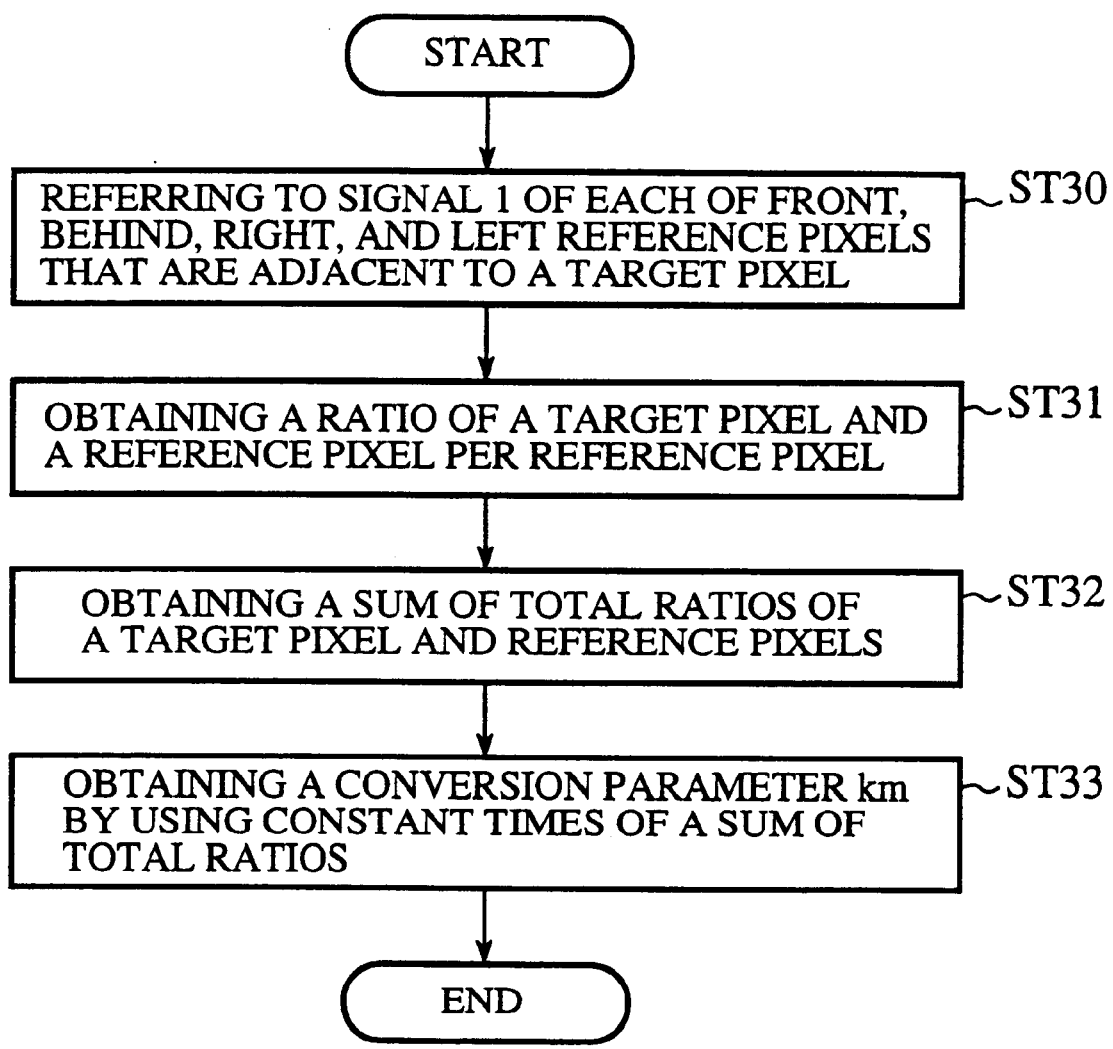
FIG. 6 is a timing chart showing the operation of the judgement section 10 in the image processing apparatus 1 shown in FIG. 4.

FIG. 6 is a timing chart showing the operation of the judgement section 10 in the image processing apparatus 1 shown in FIG. 4. That is, FIG. 6 shows the procedure of the judgement section 10.

First, the judgement section 10 refers input image signals about reference pixels that are located at front, behind, right, and left positions adjacent to a target pixel. The judgement section 10 includes delay circuits (not shown), the function of each of which is to delay the input image signals by a desired time period. As has been shown in the timing chart shown in FIG. 5, because the input image signals "n" are digital input signals transferred from external image devices (not shown) continuously, the judgement section 10 refers the pixels (m−1), (m+1), (m−L), (m+L), . . . about the target pixel "m" by using the delay circuits (omitted from the drawings). In this case, the character "−" means a time before "m" and the character "+" means a time after "m", the character "L" means the number of clocks per line, and one line means the length of a scanning by an external image device. In a concrete example, one line means one scanning performed by a scanner.

The input image signal 1 corresponding to each of the reference pixels is $S1_{m+1}$, $S1_{m-1}$, $S1_{m+L}$, and $S1_{m-L}$. In addition, the input image signal 1 corresponding to the target pixel is $S1_m$.

Next, the ratio between the target pixel and the reference pixel can be calculated per reference pixel based on the following equation (9).

$$R_{m,p} = \frac{S1_p}{S1_m}. \tag{9}$$

In the equation (9), $R_{m,p}$ is a ration between the input signal of them pixel and the input signal of the reference pixel p (p=m+L, m+1, m−1, n−L), $S1_p$ is a signal value of the input signal 1 relating to the reference pixel p, and $S_{1m}$ is a signal value of the input signal 1 relating to the m-th pixel as the target pixel.

Next, a total sum of the ratios between the target pixel and the reference pixels that have been obtained in Step ST31 is calculated (Step ST32) according to the following equation (10).

$$P_m = R_{m,m+L} + R_{m,m-L} + R_{m,m+1} + R_{m,m-1} \tag{10}$$

$P_m$ in the equation (10) indicates the total sum of the ratios between the target pixel and the reference pixels about m pixel.

The meaning of the equation (10) will be explained with reference to FIGS. 7A to 7C.

Figure 7A:
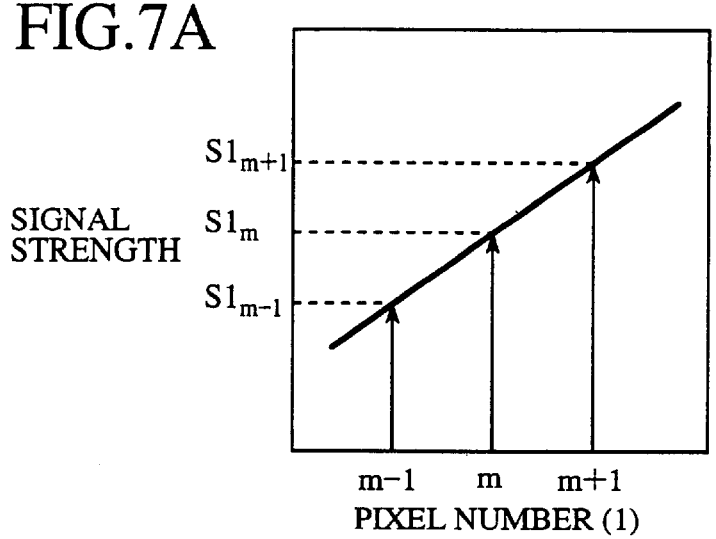
FIGS. 7A to 7C are diagrams showing changes of image signals received by the image processing apparatus 1 shown in FIG. 4.
Figure 7B:
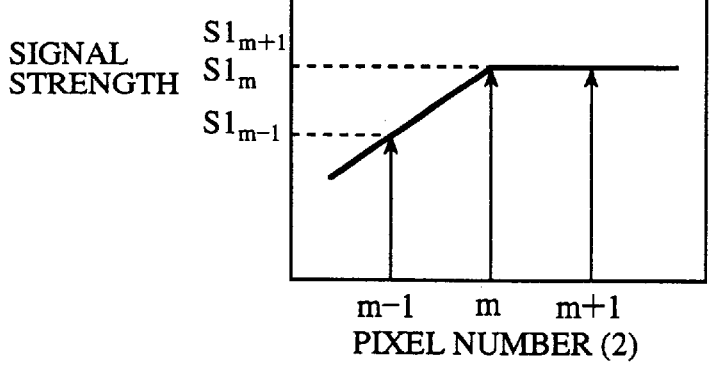
Figure 7C:
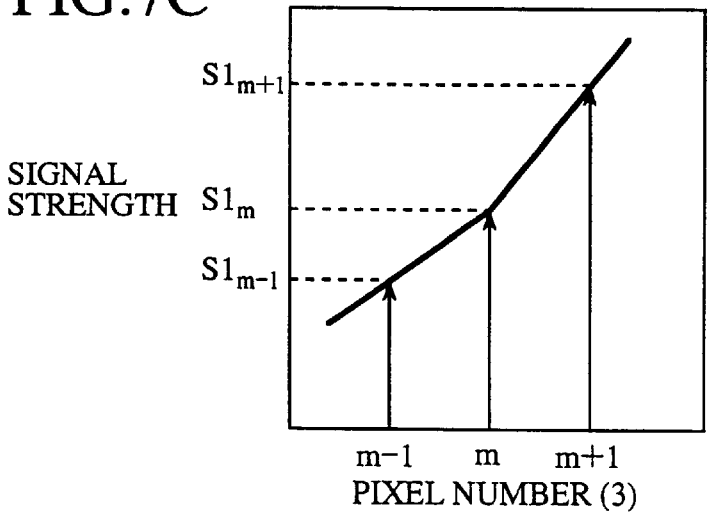

FIGS. 7A to 7C are diagrams showing the changes of the input image signals as digital image signals received by the image processing apparatus 1 shown in FIG. 4.

Although one dimension is used in FIGS. 7A to 7C for brief explanation, the case of n-dimensions can be explained by using the following same manner.

In the case shown in FIG. 7A, when the input image signal whose strength is changed at a constant rate, the value $P_m$ in the equation (10) becomes 2, namely, the relationship $P_m=2$ is satisfied.

On the other hand, in the case shown in FIG. 7B, the value $P_m$ in the equation (10) becomes $P_m<2$.

Further, in the case shown in FIG. 7C, the relationship $P_m>2$ is satisfied for the value $P_m$. That is, when there is no change of a slope, namely, the change of the signal strength, the value $P_m$ becomes $P_m=2$. When the slope of the change of the signal strength is a positive value, the relationship $P_m<2$ is satisfied for the value $P_m$.

On the other hand, when the slope of the change of the signal strength is a negative value, the value $P_m$ becomes $P_m>2$.

When the slope of the change of the signal strength becomes greater, the value $P_m$ in the equation (10) becomes greatly separate from the value $S1_m$ of a changing point (see FIGS. 7b and 7C). The value $S1_m$ of the changing point (showing a slope of a convex shape and a concave shape), is also changed according to the number of the reference pixels.

Next, the total sum obtained in Step ST32 is multiplied by a constant value. The multiplication result is referred to as a conversion parameter k (Step ST33). That is, the conversion parameter km is obtained by a constant multiple of the total sum obtained in Step ST32. This calculation to obtain the conversion parameter can be expressed by the following equation (11).

$$k_m = \left(\frac{P_m}{V} - 1\right) \times C + 1. \tag{11}$$

In the equation (11), $P_m$ is the total sum of ratios between the target pixel and the reference pixels for m-th pixel, V is a change point (for example, $S1_m$ shown in both FIGS. 7B and 7C) of a slope of a signal strength, C is a constant value.

As described above, the judgement section 10 in the image processing apparatus 1 calculates the conversion parameter km that is proportional to the change of a slope expressing the change of a signal strength in the target pixel.

Next, the operation of the ratio calculation section 11 in the image processing apparatus 1 according to the first embodiment will be explained.

The ratio calculation section 11 calculates a ratio of a signal strength of each of the input image signal 2 and the input image signal 3 to the strength of the input image signal 1 per pixel.

This calculation to obtain the ratio can be expressed by the following equation (12).

$$R2_m = \frac{S2_m}{S1_m} \tag{12}$$

$$R3_m = \frac{S3_m}{S1_m}.$$

In the equation (12), $S1_m$ designates the input image signal 1 for the m-th pixel, $S2_m$ denotes the input image signal 2 for the m-th pixel, $S3_m$ indicates the input image signal 3 of the m-th pixel, and $R2_m$ and $R3_m$ are the ratios of the input image signal 2 and the input image signal 3 to the input image signal 1, respectively.

Next, the operation of the first conversion section 12 will be explained.

The first conversion section 12 calculates an intermediate signal 1 based on the input image signal 1 and the conversion parameter $k_m$ calculated by and outputted from the judgement section 10.

The calculation for the intermediate signal 1 can be expressed by the following equation (13).

$$M1_m = k \times S1_m \tag{13}$$

Next, the operation of both the second conversion section 13 and the third conversion section 14 will be explained. Since the operation of the second conversion section 13 is equal to that of the third conversion section 14, the operation of only the second conversion section 13 will be explained.

First, the intermediate signal 1 is multiplied by the ratio transferred from the ratio calculation section 11 in order to obtain the intermediate signal 2 (like this, the third conversion section 14 calculates the intermediate signal 3 by the same manner). The calculation for these intermediate signals 2 and 3 can be expressed by the following equation (14).

$$M2_m = R2_m \times M1_m,$$

$$M3_m = R3_m \times M1_m \tag{14}$$

Next, the operation of the signal range calculation section 15 in the image processing apparatus 1 will be explained.

The signal range calculation section 15 compares each of the intermediate signals 1, 2, and 3 from the first, second, and third conversion sections 12, 13, and 14 with a predetermined signal range that has been set in advance. If an intermediate signal is over the predetermined signal range, this intermediate signal is calculated again by using the following equation (15).

$$T = \max(M1_m, M2_m, M3_m) \tag{15}$$

$if(T \leq limit) \quad S1'_m = M1_m, S2'_m = M2_m, S3'_m = M3_m$ $elseif(T = M1_m) \quad S1'_m = limit, S2'_m = limit \times R2_m, S3'_m = limit \times R3_m$ $elseif(T = M2_m) \quad S1'_m = limit \times \frac{1}{R2_m}, S2'_m = limit, S3'_m = limit \times \frac{R3_m}{R2_m}$ $elseif(T = M3_m) \quad S1'_m = limit \times \frac{1}{R3_m}, S2'_m = limit \times \frac{R2_m}{R3_m}, S3'_m = limit.$ In the equation (15), the term "limit" indicates the upper limit value of the signal, the term "max" is a function to select the maximum value in the three intermediate signals 1, 2, and 3.

The meaning of the equation (15) will be explained.

When all of the three intermediate signals 1, 2, and 3 are smaller than the upper limit value (or the maximum value), namely, those intermediate signals 1, 2, and 3 are within the predetermined signal range, the signal range calculation section 15 in the image processing apparatus 1 performs no calculation and outputs the intermediate signals 1, 2, and 3 as output signals 1, 2, and 3 to external device 1 (not shown).

If one of the three intermediate signals 1, 2, and 3 is over the predetermined signal range, a signal value corresponding to this intermediate signal is set as a newly upper limit value for output signals. The remained intermediate signals are set so that a signal ratio among the three input signals 1, 2, and 3 is not changed.

Next, the meaning of the image signals outputted from the image processing apparatus 1 of the fist embodiment will be explained with reference to FIGS. 8A to 8C.

Figure 8A:
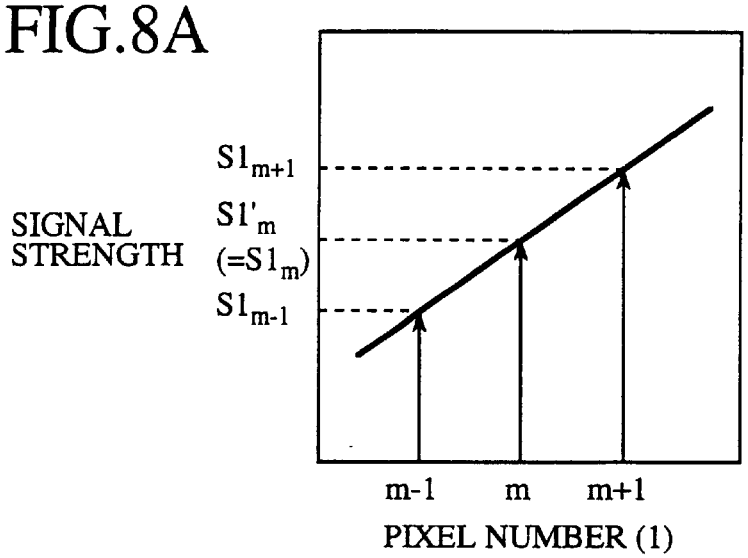
FIGS. 8A to 8C are diagrams showing changes of image signals that have been processed by the image processing apparatus 1 shown in FIG. 4.
Figure 8B:
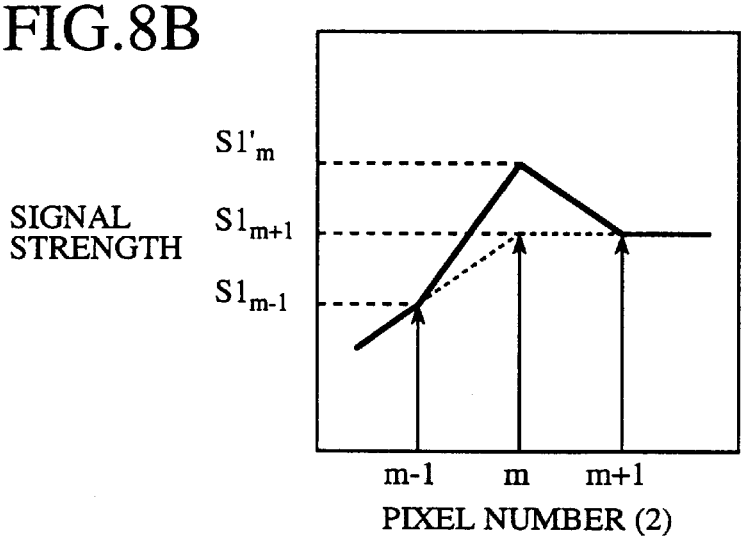
Figure 8C:
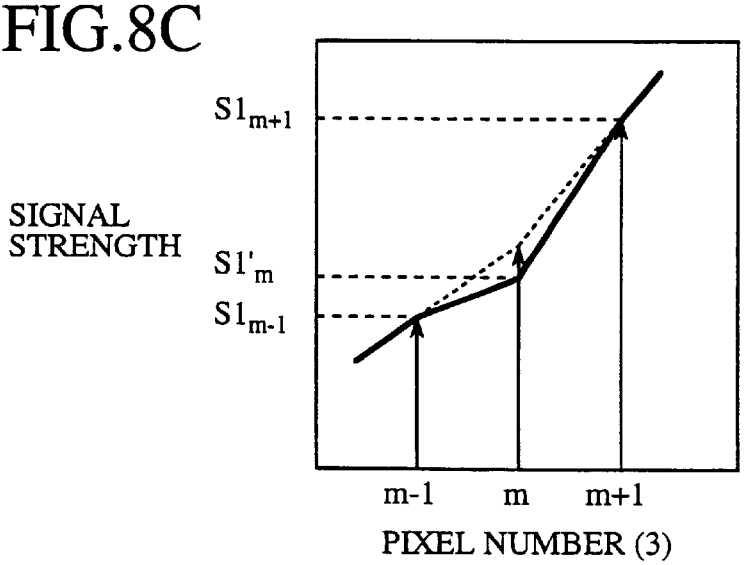

FIGS. 8A to 8C are diagrams showing the changes of image signals that have been processed by and outputted from the image processing apparatus 1 shown in FIG. 4.

FIG. 8A shows the case in which the strength of an image signal is changed at a constant rate. As obtained by the equation (11), the conversion parameter k becomes 1. Accordingly, the relationship $S1_m = S1'_m$ is satisfied. The signal value is not changed before and after the conversion processing of the image signal by the image processing apparatus 1.

FIG. 8B shows the case in which the slope of the change of the strength of an image signal has a convex shape observed from the upper side in FIG. 8B. As can be obtained by the equation (11), the conversion parameter k becomes more than 1. Accordingly, the relationship $S1_m < S1'_m$ is satisfied and the change of the strength of the image signal is rapidly changed. The rapid change of the strength of the image signal emphasizes a part where a color is changed.

FIG. 8C shows the case in which the slope of the change of the strength of an image signal has a convex shape observed from the bottom side in FIG. 8C. As obtained by the equation (11), the conversion parameter k becomes less than 1. Accordingly, the relationship $S1_m > S1'_m$ is satisfied and the change of the strength of the image signal is rapidly changed like the case shown in FIG. 8B. The rapid change of the strength of the image signal emphasizes a part where a color is changed. In addition to this feature, during the processing of the image processing apparatus 1, the ratio among the strengths of the input signals 1, 2, and 3 is not changed before and after the conversion processing and the ratio among the strengths of the output signals 1, 2, and 3 is not changed. The color made up of the output signals 1, 2, and 3 becomes similar to the color made up of the input image signals 1, 2, and 3.

As described above, according to the first embodiment, the judgement section 10 detects the change of the strength of each of the input image signals 1, 2, and 3 and calculates the conversion parameter $k_m$ for each of the input image signals 1, 2, and 3. The ratio calculation section 11, the first, second, and third conversion sections 11, 12, and 13, and the signal band calculation section 15 convert each input image signal to corresponding output image signal where the signal change is more highlighted without the change of the ratio among the strengths of a plurality of the input image signals 1, 2, and 3 before and after the conversion processing. Thereby, it is possible to suppress the change of hue of the input image signals and to output the output image signals that highlight a part where a color is changed.

In addition to this feature, the judgement section 10 in the image processing apparatus according to the first embodiment detects the change among the strengths of a target pixel and reference pixels in input image signals. However, the present invention is not limited by this, for example, it is possible to expand the range of the reference pixels in the input image signal to secondly adjacent pixels, thirdly adjacent pixels, and other surrounding pixels of the target pixels in addition to the adjacent pixels of the target pixel. This can achieve the same effect.

Second Embodiment

Figure 9:
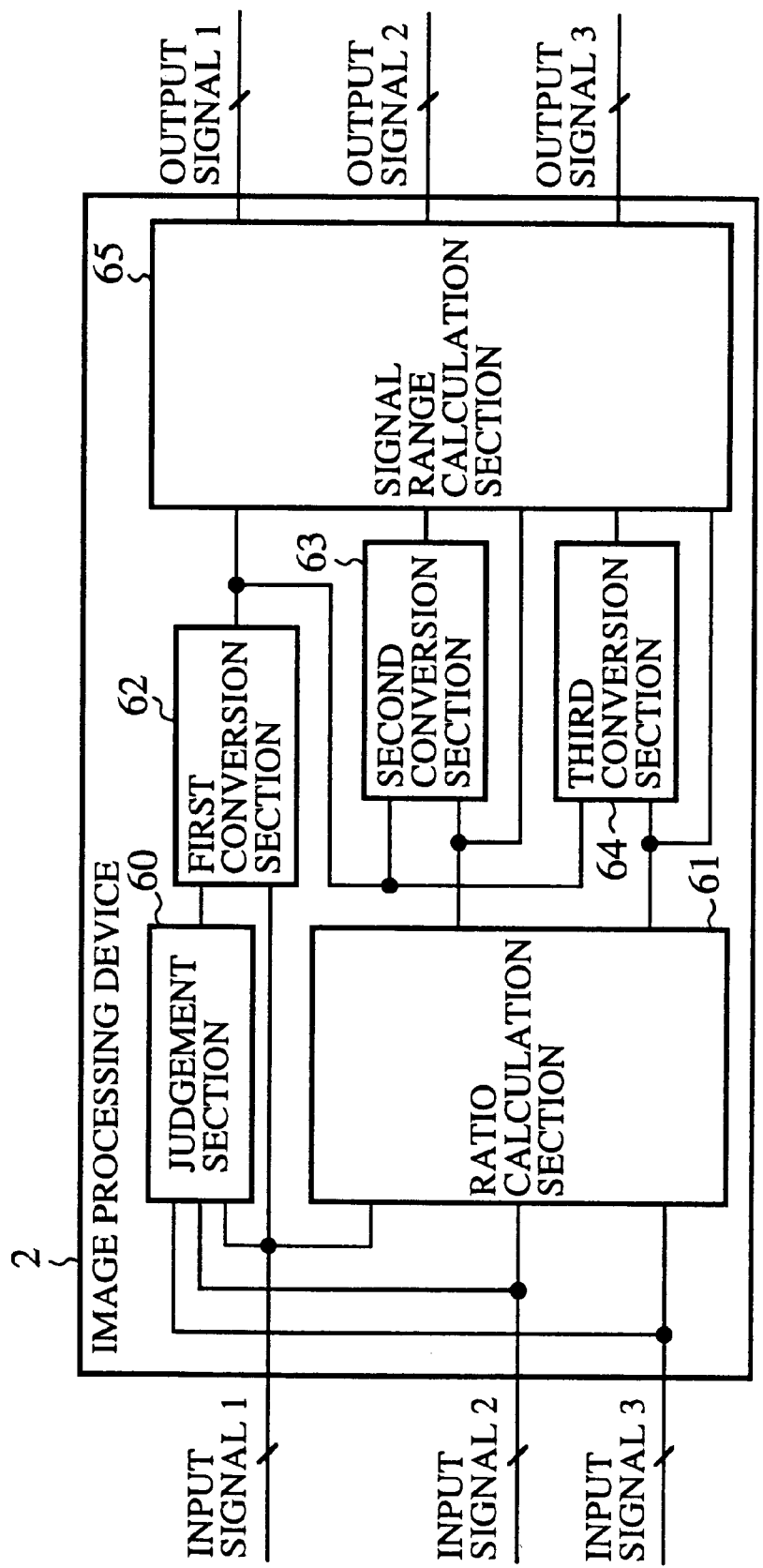
FIG. 9 is a block diagram showing a configuration of the image processing apparatus as the second embodiment according to the present invention.

FIG. 9 is a block diagram showing a configuration of the image processing apparatus as the second embodiment according to the present invention. In FIG. 9, the reference number 2 designates the image processing apparatus, and 60 denotes a judgement section to judge a relationship among input image signals 1, 2, and 3 in adjacent pixels that are adjacent to each other. The reference number 61 indicates a ratio calculation section among the input signals 1, 2, and 3 per pixel. The reference number 62 designates a first conversion section to convert the first input signal 1 based on an output signal transferred from the judgement section 60.

The reference numbers 63 and 64 designate a first conversion section and a third conversion section, respectively, for inputting output signals from both the first conversion section 62 and the ratio calculation section 61, and then for converting the second input signal 2 and the third input signal 3 based on the output signals. The reference number 65 designates a signal range calculation section for re-calculating output signals transferred from the first, second, third conversion sections 62, 63, and 64 by comparing a predetermined signal range.

Thus, the image processing apparatus 2 as the second embodiment shown in FIG. 9 has the judgement section 60, the ratio calculation section 61, the first conversion section 62, the second conversion section 63, the third conversion section 64, and the signal band calculation section 65.

Like the image processing apparatus 1 of the first embodiment, in the image processing apparatus 2 shown in FIG. 9, the input image signal 1, the input image signal 2, and the input image signal 3 are digital signals transferred continuously from external image devices (not shown) such as a digital camera, a monitor, a printer, and so on. As a concrete example, each of the input image signals 1, 2, and 3 is a RGB digital signal, or a CMY digital signal. It is also acceptable to increase the number of input image signals, for example, more than three. Each of the input image signals 1, 2, and 3 is a digital signal transferred from the external image devices (omitted from drawings) to the image processing apparatus 2 through 8 bit signal lines, 16 bit signal lines, or 32 bit signal lines.

The image processing apparatus 2 outputs output digital signals that have been obtained by processing the input image signals 1, 2, and 3 based on predetermined processes are transferred to the external image devices (not shown) such as a digital camera, a monitor, a printer, and so on. Each of the output image signals 1, 2, and 3 is a RGB signal or a CMY signal, and corresponding to each of the input image signals 1, 2, and 3, respectively. Like the input image signals 1, 2, and 3, it is also acceptable to increase the number of signal lines more than three through which the output signals are outputted from the image processing apparatus to external devices. The bit number of each output image signal is 8, 16, or 32 bits.

Next, a description will be given of the operation of the image processing apparatus 2 as the second embodiment.

FIG. 10 is a flow chart showing the operation of the judgement section 60 in the image processing apparatus 2 shown in FIG. 9.

First, the operation of the judgement section 60 in the image processing apparatus 2 will be explained.

As has been explained with reference to FIG. 5, because the input image signal n is transferred continuously in time series, the judgement section 60 refers input image signals that are signals transferred before one clock, after one clock, before L clock, and after L clock about of a target pixel. The character "L" means the number of clocks per line, and a "line" means the length of a scanning by an image device, like the first embodiment. In a concrete example, one line means one scanning performed by a scanner.

In the following explanation, the input image signal 1 corresponding to the reference pixels are $S1_{m+1}$, $S1_{m-1}$, $S1_{m+L}$, and $S1_{m-L}$, and the input image signal 2 corresponding to the reference pixels are $S2_{m+1}$, $S2_{m-1}$, $S2_{m+L}$, and $S2_{m-L}$, and the input image signal 3 corresponding to the reference pixels are $S3_{m+1}$, $S3_{m-1}$, $S3_{m+L}$, and $S3_{m-L}$. In addition, the input image signal 1 corresponding to the target pixel is $S1_m$, the input image signal 2 corresponding to the target pixel is $S2_m$, and the input image signal 3 corresponding to the target pixel is $S3_m$.

The synthesis signal value $G_m$ can be calculated by the following equation (16) (Step ST71).

$$G_m = \frac{S1_m + S2_m + S3_m}{4}. \quad (16)$$

Although a divisor is 4 in the equation (16) described above, the present invention is not limited by this, for example, it is acceptable to use a value that is a value of the n-th power of 2 as a divisor.

According to the equation (16), the synthesis signal value $G_m$ for the target pixel and the four reference pixels is obtained.

Next, ratios of the synthesis signal values of the target pixel and the reference pixels are obtained per reference pixel (Step ST72). In Step ST72, the ratio of the synthesis signal of the target pixel and the reference pixel is calculated per reference pixel by the following equation (17).

$$R_{m,p} = \frac{G_p}{G_m}. \quad (17)$$

In the equation (17), $R_{m,p}$ is a ratio between the pixel m and the reference pixel p (p=m+L, m+1, m−1, m−L), $G_p$ is a synthesis signal value of the reference pixel p, $G_m$ is a synthesis signal value of the target pixel m.

Next, a total sum of all of the synthesis signal values for all of the target pixel and the reference pixels obtained in Step ST72 is calculated by using the following equation (18).

$$P_m = R_{m,m+L} + R_{m,m-L} + R_{m,m+1} + R_{m,m-1} \quad (18).$$

In the equation (18), $P_m$ is the total sum of the ratios of the synthesis signals of the target pixel and the reference pixels for the pixel m. The meaning of the equation (18) is the same as the case shown in FIGS. 7A to 7C in the first embodiment. Accordingly, the explanation of the meaning is omitted here for brevity.

Next, a functional conversion is performed for the total sum of the synthesis signal values calculated in Step ST73 to calculate the conversion parameter $k_m$ by using the following equation (19).

$$k_m = f(P_m) \quad (19).$$

In the equation (19), $P_m$ is the total sum of the ratios of the synthesis signal values of the target pixel and the reference pixels for the pixel m, and the symbol "f" indicates a function.

FIG. 11 is a diagram showing the function "f" that indicates a relationship between the total sum $P_m$ (that is a total sum of ratios of synthesis signals between the target pixel and the reference pixels for the pixel m) and the conversion parameter $K_m$.

In the example shown in FIG. 11, the upper limit value and the lower limit value of the conversion $K_m$ is obtained, and the total sum of the ratios of the synthesis signal values and the conversion parameter $k_m$ are smoothly corresponds to each other. In addition to this, the total sum of the ratio of the synthesis signal values for an image whose signal strength changes at a constant rate is 2, as shown in FIG. 11. Thus, the judgement section 60 calculates the conversion parameter $k_m$ that is proportional to the slope of the change of the strength of the input signal about the target pixel m by using the above manner.

Because the operation of each of the ratio calculation section 61, the first conversion section 62, the second conversion section 63, the third conversion section 64, and the signal range calculation section 65 incorporated in the image processing apparatus 2 as the second embodiment shown in FIG. 9 are the same as the operation of the ratio calculation section 11, the first conversion section 12, the second conversion section 13, the third conversion section 14, and the signal range calculation section 15 incorporated in the image processing apparatus 1 as the first embodiment shown in FIG. 4. Accordingly, the explanation of the operation of the same components is omitted here.

As described above, in the image processing apparatus 2 as the second embodiment, the judgement section 60 judges the change of the input image signals 1, 2, and 3 based on the ratios of the synthesis signal values and calculates the conversion parameter $k_m$ by using the function having the upper limit value (the maximum value) and the lower limit value (the minimum value). In addition, the ratio calculation section 61, the first conversion section 62, the second conversion section 63, the third conversion section 64, and the signal range calculation section 65 convert the input image signals to output image signals in which the change of the image signals is highlighted, without any change of the ratio of the strength of the image signals before and after the conversion processing, based on the conversion parameter $k_m$. Accordingly, even if the strength of one of the input image signals 1, 2, and 3 is changed, it is possible to obtain the conversion parameter $k_m$ without any changing the hue of the input image signals and it is also possible to output image signals as the output signals in which the part of change of a color is highlighted. Further, because the synthesis signals may be obtained by performing a divisional operation using a value of the n-th power of 2 as a divisor in the judgement section 60, it is possible to form the image processing apparatus easily on a hardware.

Third Embodiment

Figure 12:
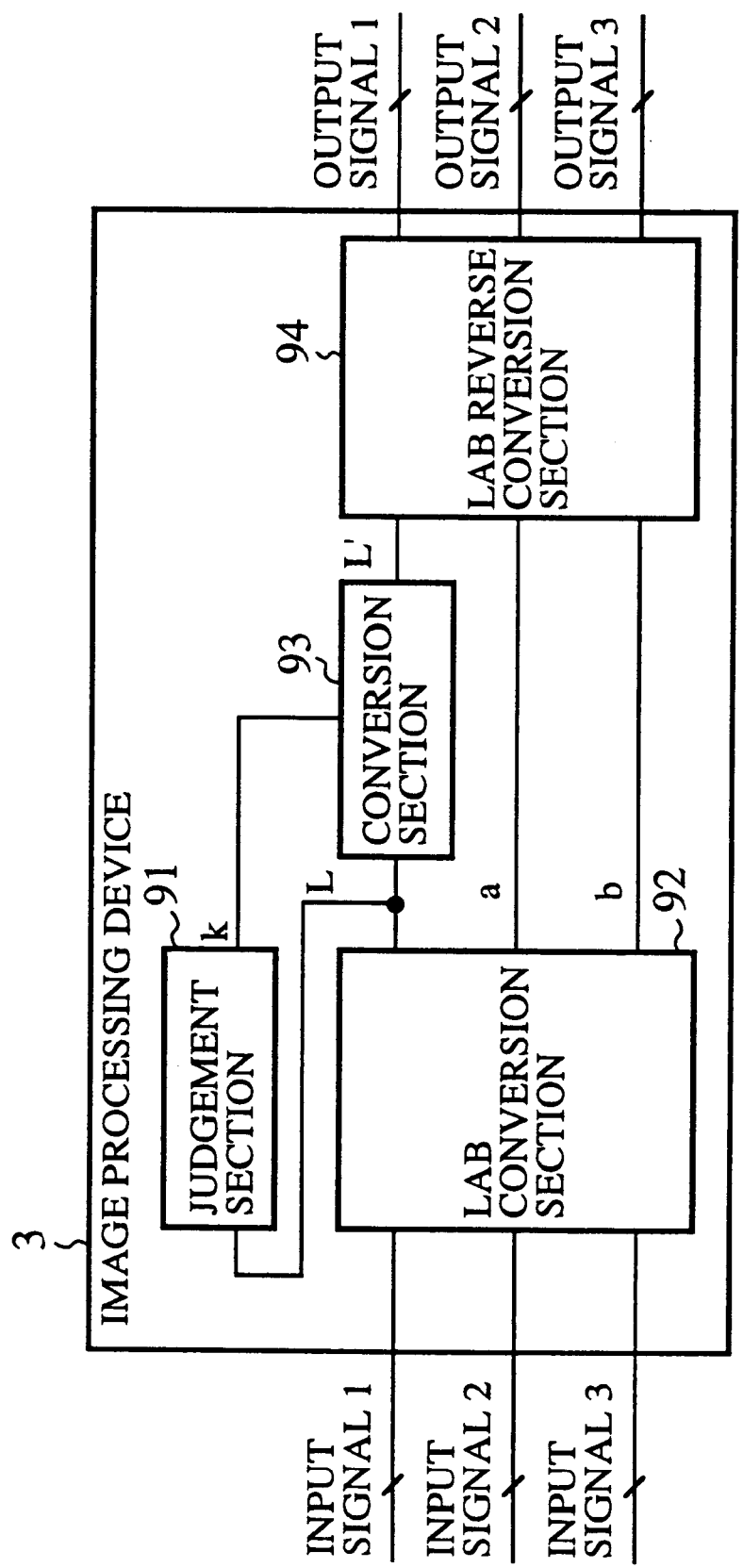
FIG. 12 is a block diagram showing a configuration of the image processing apparatus as the third embodiment according to the present invention.

FIG. 12 is a block diagram showing the configuration of the image processing apparatus 3 as the third embodiment according to the present invention. In FIG. 12, the reference number 92 designates a Lab conversion section for inputting input image signals 1, 2, and 3 and for performing a coordinate conversion of the input image signals 1, 2, and 3. The reference number 92 denotes a judgement section for judging a relationship between signals "L", "a", and "b" of adjacent pixels output from the Lab conversion section 92. The reference number 93 indicates a conversion section for inputting an output signal from the judgement section 91 and for converting the signal L, the signal a, and the signal b from the Lab conversion section 92 based on the output signal from the judgement section 91. The reference number 94 designates a Lab reverse conversion section for converting the output signals from the conversion section 93 and the Lab conversion section 92 to output signals 1, 2, and 3. Thus, the image processing apparatus 3 as the third embodiment has the judgement section 91, the Lab conversion section 92, the conversion section 93, and the Lab reverse conversion section 94.

Like the image processing apparatuses 1 and 2 as the first and second embodiments, in the image processing apparatus 3 shown in FIG. 12, the input image signal 1, the input image signal 2, and the input image signal 3 are digital signals transferred from external image devices (not shown) such as a digital camera, a monitor, a printer, and so on. As a concrete example, each of the input image signals 1, 2, and 3 is a RGB digital signal, or a CMY digital signal. It is also acceptable to increase the number of input image signals, for example, more than three. Each of the input image signals 1, 2, and 3 is a digital signal transferred from the external image devices (omitted from drawings) to the image processing apparatus 3 through 8 bit signal lines, 16 bit signal lines, or 32 bit signal lines.

The image processing apparatus 3 outputs output digital signals that have been obtained by processing the input image signals 1, 2, and 3 based on predetermined processes are transferred to the external image devices (not shown) such as a digital camera, a monitor, a printer, and so on. Each of the output image signals 1, 2, and 3 is a RGB signal or a CMY signal, and corresponding to each of the input image signals 1, 2, and 3, respectively. Like the input image signals 1, 2, and 3, it is also acceptable to increase the number of signal lines more than three through which the output image signals are outputted from the image processing apparatus to external devices. The bit number of each output image signal is 8, 16, or 32 bits.

Next, a description will be given of the operation of the image processing apparatus 3 as the third embodiment.

The input image signals 1, 2, and 3 are digital signals in time series and are also the same as the input image signals 1, 2, 3 that have been described in the explanation for the first embodiment. Accordingly, the explanation of the input image signals 1, 2, and 3 is omitted here.

Next, the operation of the Lab conversion section 92 will be explained.

The term "Lab" is a coordinate of a color defined by Commission Internationale de l'Eclairage (CIE), namely International Commission on Illumination (in English). The Lab conversion section 92 converts the input image signals 1, 2, and 3 into Lab signals by using a lookup-table. These converted signals will be referred to as a signal L, a signal a, and a signal b.

Next, the operation of the judgement section 91 will be explained.

The proceedings of the operation of the judgement section 91 is basically the same as the proceedings of the operation shown by the flow chart in FIG. 6. Only difference of them is the input image signal 1 is replaced with the signal L in the third embodiment.

The conversion parameter $k_m$ is obtained by performing the proceedings of Step ST30 to ST33. Because the meaning of the conversion parameter $k_m$ is equal to the same in the case shown in FIGS. 7A to 7C, the explanation of the meaning is therefore omitted here.

The conversion section 93 in the image processing apparatus 3 performs the same operation of the first conversion section 12 in the first embodiment. In this case, the input image signal 1 is also replaced with the signal L, like the conversion section 93 described above. The explanation for the meaning is therefore omitted here. The signal that has been converted by the conversion section 93 will be referred to as a signal L'.

Next, the operation of the Lab reverse conversion section 94 will be explained.

The Lab reverse conversion section 94 performs the reverse operation of the Lab conversion section 92. That is, the Lab reverse conversion section 94 converts data in a Lab color space to data in a signal space. The Lab reverse conversion section 94 converts the signal L', the signal a, the signal b into the output signal 1, the output signal 2, and the output signal 3 by using a lookup table.

As described above, in the image processing apparatus according to the third embodiment, the Lab conversion section 92 converts the input image signals 1, 2, and 3 into signals in the Lab color space. Further, the judgement section 91 judges the change of the signal L that has been converted by the Lab conversion section 92 and then calculates the conversion parameter $K_m$. The conversion section 93 converts the output signal from the Lab conversion section 92 to the signal whose change is highlighted based on the conversion parameter $k_m$ provided from the judgement section 91. After this, the Lab reverse conversion section 94 converts the signal from the Lab conversion section 92 and the conversion section 93 to the output image signals 1, 2, and 3. Accordingly, the signal a and the signal b expressing a hue and a brightness can be kept and it is possible to obtain the image signals capable of highlighting a part of the change of a color. Further, it is possible to form the image processing apparatus easily on a hardware.

In the third embodiment described above, the Lab conversion section 92 and the Lab reverse conversion section 94 are used in the image processing apparatus 3. However, the present invention is not limited by this configuration, for example, it is possible to incorporate means for converting input image signals to signals (for example, relating to brightness or chromaticness) and for performing the reverse-conversion of the signals. In this case, the judgement section 92 performs the judgement operation by using the signal relating to brightness and it is also possible to obtain the same effect.

Fourth Embodiment

Figure 13:
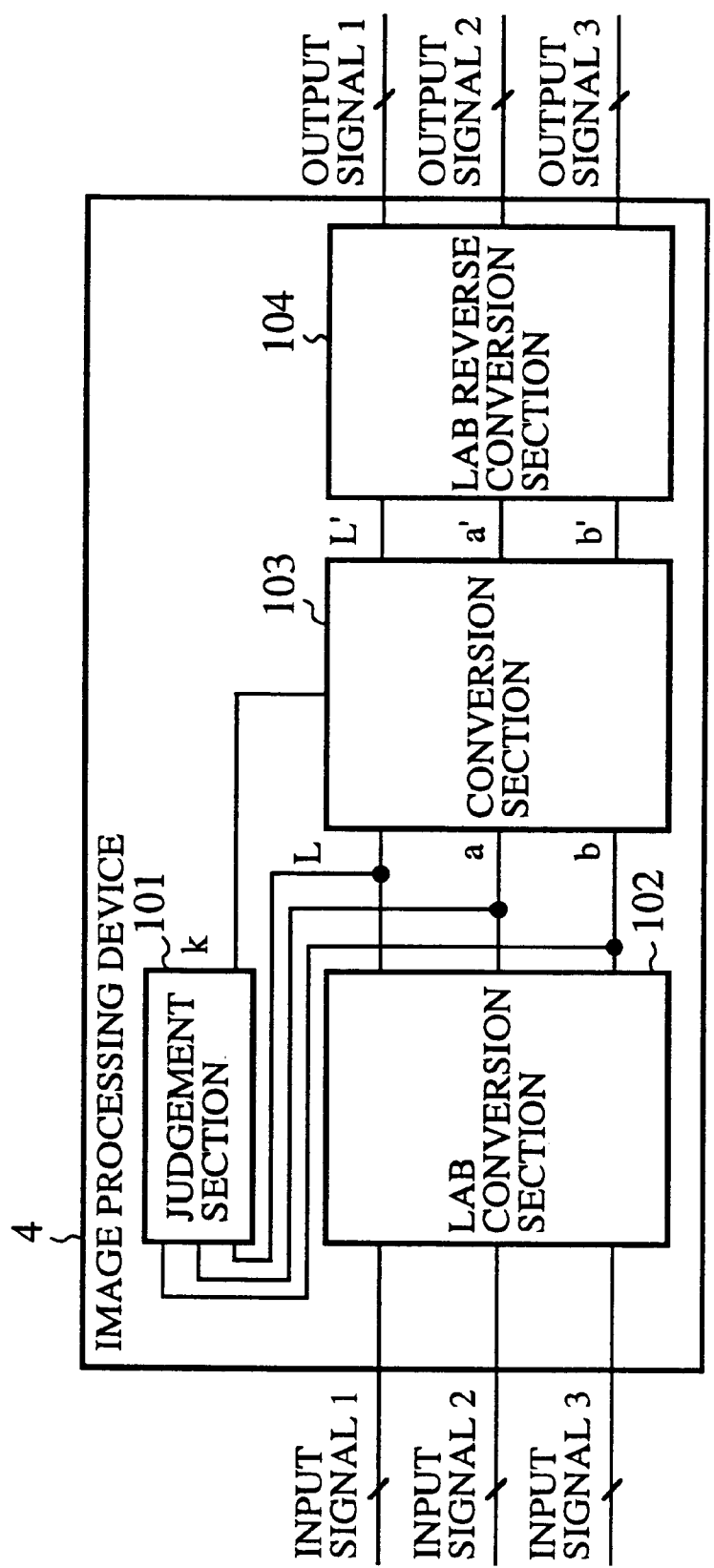
FIG. 13 is a block diagram showing a configuration of the image processing apparatus as the fourth embodiment according to the present invention.

FIG. 13 a block diagram showing a configuration of the image processing apparatus 4 as the fourth embodiment according to the present invention. In FIG. 13, the reference number 4 designates the image processing apparatus. The reference number 102 designates a Lab conversion section for inputting input image signals 1, 2, and 3 and for performing a coordinate conversion of the input image signals 1, 2, and 3. The reference number 103 denotes a judgement section for judging a relationship between signals L, a, and b of adjacent pixels output from the Lab conversion section 92. The reference number 103 indicates a conversion section for inputting an output signal from the judgement section 101 and for converting the signal L, the signal a, the signal b from the Lab conversion section 92 based on the output signal from the judgement section 101. The reference number 104 designates a Lab reverse conversion section for converting the output signals from the conversion section 103 and the Lab conversion section 102 to output signals 1, 2, and 3. Thus, the image processing apparatus 4 as the fourth embodiment has the judgement section 101, the Lab conversion section 102, the conversion section 103, and the Lab reverse conversion section 104.

Like the image processing apparatuses 1, 2, and 3 as the first to third embodiments, in the image processing apparatus 4 shown in FIG. 13, the input image signal 1, the input image signal 2, and the input image signal 3 are digital signals transferred from external image devices (not shown) such as a digital camera, a monitor, a printer, and so on. As a concrete example, each of the input image signals 1, 2, and 3 is a RGB digital signal, or a CMY digital signal. It is also acceptable to increase the number of input image signals, for example, more than three. Each of the input image signals 1, 2, and 3 is a digital signal transferred from the external image devices (omitted from drawings) to the image processing apparatus 4 through 8 bit signal lines, 16 bit signal lines, or 32 bit signal lines.

The image processing apparatus 4 outputs output digital signals that have been obtained by processing the input image signals 1, 2, and 3 based on predetermined processes are transferred to the external image devices (not shown) such as a digital camera, a monitor, a printer, and so on. Each of the output signals 1, 2, and 3 is a RGB signal or a CMY signal, and corresponding to each of the input image signals 1, 2, and 3, respectively. Like the input image signals 1, 2, and 3, it is also acceptable to increase the number of signal lines more than three through which the output image signals are outputted from the image processing apparatus to external devices. The bit number of each output image signal is 8, 16, or 32 bits.

Next, a description will be given of the operation of the image processing apparatus 4 as the fourth embodiment.

The input image signals 1, 2, and 3 are digital signals in time series and are also the same as the input image signals 1, 2, 3 that have been described in the explanation for the first embodiment shown in FIG. 5. Further, the operation of the Lab conversion section 102 in the fourth embodiment shown in FIG. 13 is the same as that of the Lab conversion section 92 in the third embodiment shown in FIG. 12. Accordingly, the explanation about the input image signals 1, 2, and 3 and the Lab conversion section 102 is omitted here.

Next, the operation of the judgement section 101 will be explained.

FIG. 14 is a flow chart showing the operation of the judgement section 101 in the image processing apparatus 4 shown in FIG. 13. First, the judgement section 101 refers the signal L, the signal a, and the signal b of each of reference pixels, that are adjacent to a target pixel, at front, behind, right, and left positions by using the signal L, the signal a, and the signal b transferred from the Lab conversion section 1012 and to be provided to the judgement section 101 (Step ST110).

Like the explanation referring to FIG. 5 for the first embodiment, because the input image signals are digital signals transferred continuously in time series, the judgement section 101 includes delay circuits (not shown) whose function are to delay the input image signals by a desired time period. The judgement section 101 refers signals that are input image signals before one clock, after one clock, before L clock, and after L clock according to the target pixel. In this case, the character "L" means the number of clocks per line, and one line means the length of a scanning by an image device. In a concrete example, one line means one scanning performed by a scanner. In the following explanation, the reference signal L is described by using $S1_{m+1}, S1_{m-1}, S1_{m+L},$ and $S1_{m-L}$, the signal a is described by using $S2_{m+1}, S2_{m-1}, S2_{m+L},$ and $S2_{m-L}$, and the signal b is described by using $S3_{m+1}, S3_{m-1}, S3_{m+L},$ and $S3_{m-L}$.

Next, the difference between vectors of the target pixel and the reference pixel is calculated per reference pixel (Step ST111). The following equation (20) is a definition of the vector made up of signals corresponding to each pixel.

$$\vec{V}_m = (S1_m, S2_m, S3_m) \quad (20).$$

In the equation (20), the vector $V_m$ means a vector made up of signals of the m-th pixel. By using the vector V, the difference between the vectors of the target pixel and the reference pixel is calculated based on the following equation (21).

$$\vec{W}_{m,p} = \vec{V}_p - \vec{V}_m \quad (21).$$

In the equation (21), the vector $W_{m,p}$ is a difference of the vectors made up of the signals of the pixel m and the reference pixels p (p=m+L, m+1, m−1, and m−L).

Next, the total sum of the differences of the vectors of the target pixel and the reference pixels is obtained (Step ST112). Where the total sum of the differences of the vectors of the target pixel and the reference pixels that have been obtained in Step ST111 is calculated by the following equation (22).

$$\vec{X}_m = \vec{W}_{m,m-1} + \vec{W}_{m,m+1} + \vec{W}_{m,m-L} + \vec{W}_{m,m+L} \quad (22).$$

In the equation (22), the vector $X_m$ is the total sum of the differences of the vectors of the target pixel and the reference pixels.

The meaning of the value obtained by the equation (22) is almost equal to the meaning shown in FIGS. 7A to 7C. However, because the calculation for vectors is performed in the equation (22), the result of the calculation executed by the judgement section 101 becomes more complicated in meaning than that of the case shown in FIGS. 7A to 7C.

Figure 15A:
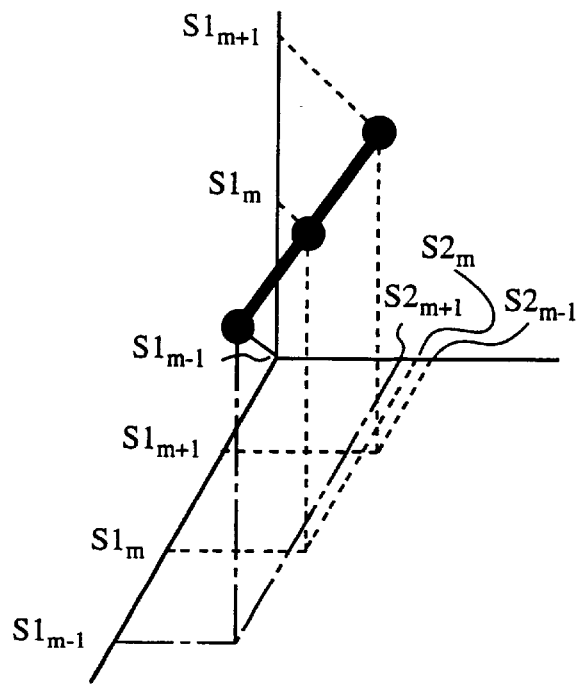
FIGS. 15A and 15B are diagrams showing changes of colors of pixels m−1, m, and m+1 in Lab color space.
Figure 15B:
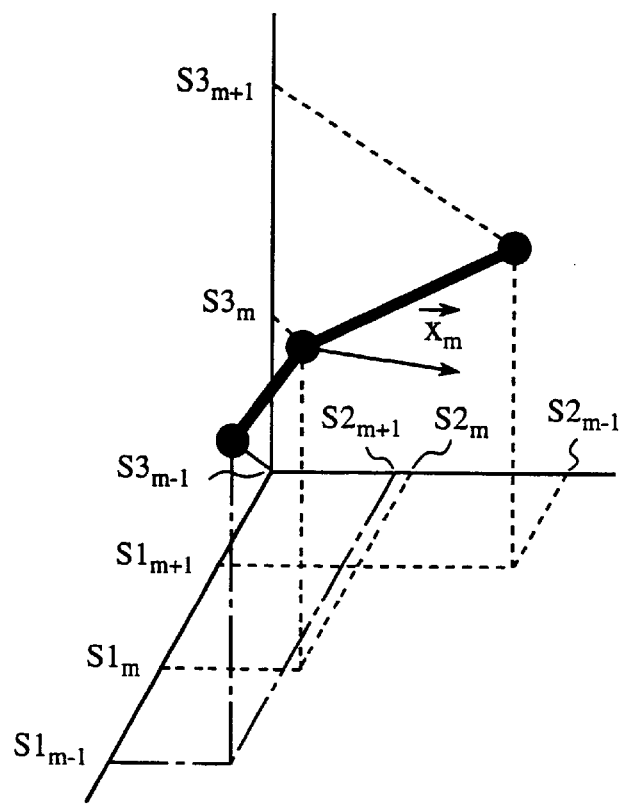

Referring to FIGS. 15A and 15B, the value obtained by the equation (12) will be explained.

FIGS. 15A and 15B are diagrams showing changes of colors of pixels m−1, m, and m+1 in the Lab color space.

FIG. 15A shows the case in which the color of each of the pixels m−1, m, and m+1 is changed at a constant rate. Because the change of the value calculated by the equation (12) in each axis in the three dimension space is a constant, it is apparently shown that the color of each of the pixels m−1, m, and m+1 is changed at a constant rate.

In both FIGS. 15A and 15B, the symbol "●" designates a color of each pixel. Because the vectors $W_{m,m-}, W_{m,m+1}$ are vectors whose magnitudes are same. The directions of the vectors are in the opposite direction to each other, and the total sum of the vector $X_m$ becomes zero.

FIG. 15B shows the case in which the color of each of the pixels m−1, m, m+1 is changed, not at a constant rate. Because the change of each axis is irregular, it can be understood that the rate of the change of the color is not a constant rate. In this case, the total sum $X_m$ of the vectors $W_{m,m-1}, W_{m,m+1}$ becomes a vector, not zero vector. In FIG. 15B, the vector $X_m$ is shown by the symbol "→".

When both FIGS. 15A and 15B are observed in detail, the vector $X_m$ has the slope whose direction indicates a greater change of the color. That is, when the change of the color is greater, the magnitude of the vector $X_m$ becomes greater.

Next, the conversion parameter $k_m$ is calculated by performing the functional conversion of the total sum vector $X_m$ of the differences of the signal vectors of the target pixel and the reference pixels that has been obtained in Step ST112 (Step ST113). There is the following equation (23) as this functional conversion.

$$k_m = (\vec{X}_m \cdot \vec{e}_L) \times C \quad (23).$$

In the equation (23), the vector $e_L$ is an unit vector in the direction L in the Lab color space, and C is a constant value.

It is defined that the conversion parameter $k_m$ is a value obtained by multiplying a value of an inner product of a vector $X_m$ and a vector $e_L$ by a constant value. In the above equation (23), the vector $e_L$ is an unit vector in direction L in the Lab color space. However, it is also possible to use an optional different direction other than the direction L for the vector $e_L$.

By using the manner described above, the judgement section 101 obtains the conversion parameter $k_m$ that is proportional to the magnitude of the vector about the change of the strength of the signal in the target pixel.

Next, the operation of the conversion section 103 will be explained.

The conversion section 103 obtains the signal L', the signal a', and the signal b' by converting the signal L, the signal a, and the signal b transferred from the Lab conversion section 102 corresponding to the input image signals 1, 2, and 3 of the target pixel, respectively, by using the conversion parameter $k_m$ obtained by the judgement section 101.

Figure 16:
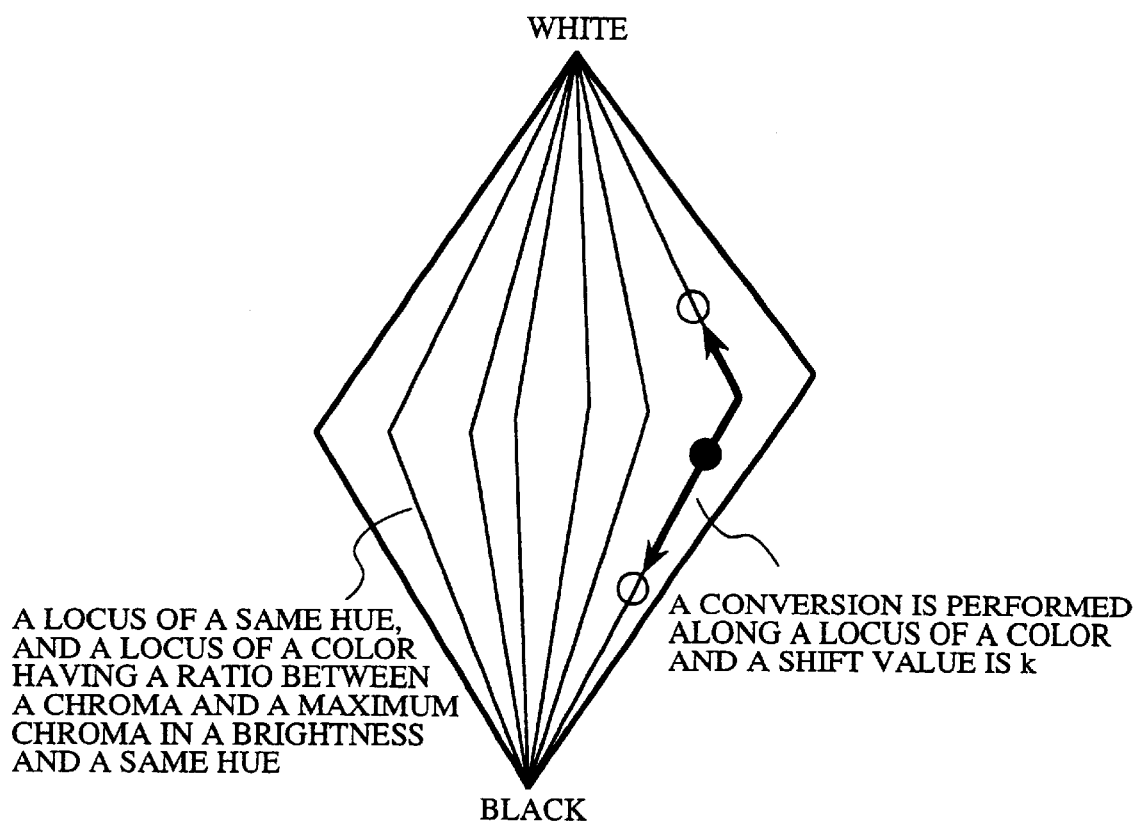
FIG. 16 is a diagram showing a conversion processing by the conversion section 103 by using a color gamut model.

FIG. 16 is a diagram showing the conversion processing by the conversion section 103 by using a color gamut model. In this case, the color gamut model is a range of a color reproduced handled by a device. In general, a color can be described by using three attributes such as a hue, a brightness, and a chromaticness.

In the color model shown in FIG. 16, each thick line means a line connecting colors having the maximum chromaticness that can be reproduced, and each fine line means a line connecting colors having a same hue, and a same ratio of chromaticness to the maximum chromaticness reproduced by a brightness in the same hue.

The line connecting colors having a same hue and a same ratio of chromaticness to the maximum chromaticness reproduced by a brightness in the same hue.

The conversion operation for colors is performed along the line having the same hue and the same ratio of chromaticness to the maximum chromaticness reproduced by a brightness in the same hue by the conversion section 103. In FIG. 16, when the symbol "●" designates a color of the target pixel, the conversion processing is executed along the arrow. In this case, the conversion section 103 converts a signal to a signal having another color along one of the directions designated by the symbol "○" according to the sign of the conversion parameter $k_m$. The conversion section 103 converts the signal L, the signal a, the signal b to the signal L', the signal a', and the signal b'.

Because the operation of the Lab reverse conversion section 104 is the same as that of the Lab reverse conversion section 94 in the third embodiment, the explanation for the operation is omitted here.

As described above, in the image processing apparatus according to the fourth embodiment, the Lab conversion section 102 converts the input image signals 1, 2, and 3 into signals in the Lab color space. Further, the judgement section 101 judges the change of the signal L, the signal a, and the signal b that have been converted by the Lab conversion section 102 and then calculates the conversion parameter $K_m$. The conversion section 103 converts the output signal from the Lab conversion section 102 to the signal whose change is highlighted based on the conversion parameter $k_m$ provided from the judgement section 101. After this, the Lab reverse conversion section 104 converts the signal from the Lab conversion section 102 and the conversion section 103 to the output image signals 1, 2, and 3. Accordingly, the ratio of the signal a and the signal b expressing a hue and a brightness can be kept and it is possible to obtain the image signals capable of highlighting a part of the change of a color. Further, it is possible to form the image processing apparatus easily on a hardware. In addition, in the image processing apparatus according to the fourth embodiment, the Lab conversion section 102 and the Lab reverse conversion section 104 are used in the image processing apparatus 4. However, the present invention is not limited by this configuration, for example, it is possible to incorporate means for converting input signals of images to signals (for example, relating to brightness or chromaticness) and for performing the reverse-conversion of the signals. In this case, the judgement section 92 performs the judgement operation by using the signal relating to brightness and it is also possible to obtain the same effect.

As described above, according to the present invention, the image processing apparatus has the configuration in which the judgement means inputs input image signals of n color components (n is a positive integer not less than three) forming colors of a plurality of image pixels transferred from an external device in time series, calculates a synthesis signal value of a target image pixel per input color component in said input image signals by performing a division of a sum of signal strength values of said input image signal about said target image pixel by a value of the n-th power of 2, and calculates a synthesis signal value of reference image pixels per color component in said input image signals by performing a division of a sum of signal strength values of said input image signals about said reference image pixels adjacent to said target image pixel by using the value of the n-th power of 2, calculates a ratio of said synthesis signal values of each reference image pixel and said target image pixel per reference image pixel, and calculates a conversion parameter indicating a change rate of signal strength values of said input image signals per color component based on a total sum of said ratios of said synthesis signal values. In addition, the conversion means converts said input image signals to output image signals without a change of a ratio of signal strength values between said input image signals per n-color component based on said conversion parameter per color component obtained by said judgement means. Accordingly, this configuration and function of the image processing apparatus achieves to suppress any change of hue of the input image signals and to highlight a part of change of color of the input image signals, and to form the image processing apparatus on a hardware easily.

Furthermore, according to the present invention, the data processing apparatus has the configuration in which the coordinate conversion means inputs input image signals of n color components (n is a positive integer not less than three) forming colors of a plurality of image pixels transferred from an external device in time series, converts said input image signals to brightness signals, chromaticness signals, and hue signals. The judgement means inputs said brightness signals, said chromaticness signals, and said hue signals transferred from said coordinate conversion means, calculates a ratio of a change of said input image signals among a target pixel and reference pixels adjacent to said target pixel by using a difference of vectors per brightness signal, chromaticnes signal, and hue signal, and calculates a total sum value of said differences of said vectors, and for calculating a conversion parameter per brightness signal, chromaticness signal, and hue signal by calculating an inner product of said total sum value and an unit vector of each of said brightness signals, said chromaticness signals, and said hue signals. The conversion means converts said brightness signals, said chromaticness signals, and said hue signals without a change of a ratio of signal strength values between said brightness signals, said chromaticness signals, and said hue signals based on said conversion parameters per brightness signal, chromaticnes signal, and hue signal. In addition, the reverse converting means converts said brightness signals, said chromaticness signals, and said hue signals outputted from said conversion means to output image signals of n color components forming colors. Accordingly, this configuration and function of the image processing apparatus achieves to suppress any change of hue of the input image signals and to highlight a part of change of color of the input image signals, and to form the image processing apparatus on a hardware easily.

While the above provides a full and complete disclosure of the preferred embodiments of the present invention, various modifications, alternate constructions and equivalents may be employed without departing from the scope of the invention. Therefore the above description and illustration should not be construed as limiting the scope of the invention, which is defined by the appended claims.

What is claimed is:

1. An image processing apparatus comprising:

judgement means for inputting input image signals of n color components (n is a positive integer not less than three) forming colors of a plurality of image pixels transferred from an external device in time series, for calculating a synthesis signal value of a target image pixel per input color component in said input image signals by performing a division of a sum of signal strength values of said input image signals about said target image pixel by a value of the n-th power of 2, and for calculating a synthesis signal value of reference image pixels per color component in said input image signals by performing a division of a sum of signal strength values of said input image signals about said reference image pixels adjacent to said target image pixel by using the value of the n-th power of 2, for calculating a ratio of said synthesis signal values of each reference image pixel and said target image pixel per reference image pixel, and for calculating a conversion parameter indicating a change rate of signal strength values of said input image signals per color component based on a total sum of said ratios of said synthesis values; and conversion means for converting said input image signals to output image signals without a change of a ratio of signal strength values between said input image signals per n-color component based on said conversion parameter per color component obtained by said judgement means.

2. An image processing apparatus as claimed in claim 1, wherein said judgement means selects input image signals as one color component in said input image signals forming said n color components, calculates a sum of signal strength values of said input image signals about said target image pixel as said synthesis signal value of said target image pixel per selected input image signals, calculates a sum of signal strength values of said input image signals about said reference image pixels as said synthesis signal value of said reference image pixels per selected input image signals, then calculates said ratio of said synthesis signal values of said target image pixel and said reference image pixel per reference image pixel, and calculates said conversion parameter indicating the change of the signal strength value of said input image signals of said selected color component based on said total sum of said synthesis signal values, and wherein said conversion means converts said input image signals without a change of said ratio of said signal strength values between said input image signals based on said conversion parameter per color component obtained by said judgement means.

3. An image processing apparatus as claimed in claim 1, further comprises signal range calculation means for setting a signal strength value of said output image signals outputted from said conversion section as a new upper limit value when said signal strength value of said output image signals is over a predetermined value, and for re-calculating said signal strength value of said output image signal transferred from said conversion means without any change of said ratio of said signal strength value among said input image signals of said n color components (n is a positive integer not less than three), and for outputting re-calculated output image signals.

4. An image processing apparatus as claimed in claim 2, further comprises signal range calculation means for setting a signal strength value of said output image signals outputted from said conversion section as a new upper limit value when said signal strength value of said output image signals is over a predetermined value, and for re-calculating said signal strength value of said output image signal transferred from said conversion means without any change of said ratio of said signal strength value among said input image signals of said n color components (n is a positive integer not less than three), and for outputting re-calculated output image signals.

5. An image processing apparatus comprising:

coordinate conversion means for inputting input image signals of n color components (n is a positive integer not less than three) forming colors of a plurality of image pixels transferred from an external device in time series, for converting said input image signals to brightness signals, chromaticness signals, and hue signals;

judgement means for inputting said brightness signals, said chromaticness signals, and said hue signals transferred from said coordinate conversion means, for calculating a ratio of a change of said input image signals among a target pixel and reference pixels adjacent to said target pixel by using a difference of vectors per brightness signal, chromaticness signal, and hue signal, and for calculating a total sum value of said difference of said vectors, and for calculating a conversion parameter per brightness signal, chromaticness signal, and hue signal by calculating an inner product of said total sum value and an unit vector of each of said brightness signals, said chromaticness signals, and said hue signals;

conversion means for converting said brightness signals, said chromaticness signals, and said hue signals without a change of a ratio of signal strength values between said brightness signals, said chromaticness signals, and said hue signals based on said conversion parameters per brightness signal, chromaticness signal, and hue signal; and reverse converting means for converting said brightness signals, said chromaticness signals, and said hue signals outputted from said conversion means to output image signals of n color components forming colors.

6. An image processing apparatus as claimed in claim 5, wherein said judgement means calculates said, conversion parameters indicating a change rate of the brightness signals by calculating a ratio of the brightness signals between said target pixel and said reference pixels, per reference pixel and calculating the total sum of said ratio of said brightness signals, and wherein said conversion means converts said brightness signals, said chromaticness signals, and said hue signals without a change of said ratio of said signal strength values between said brightness signals based on said conversion parameters per brightness signal.

7. An image processing apparatus as claimed in claim 1, wherein the judgement means calculates said conversion parameters within a range of a lower limit value to an upper limit value for said conversion parameters.

8. An image processing apparatus as claimed in claim 2, wherein the judgement means calculates said conversion parameters within a range of a lower limit value to an upper limit value for said conversion parameters.

9. An image processing apparatus as claimed in claim 3, wherein the judgement means calculates said conversion parameters within a range of a lower limit value to an upper limit value for said conversion parameters.

10. An image processing apparatus as claimed in claim 4, wherein the judgement means calculates said conversion parameters within a range of a lower limit value to an upper limit value for said conversion parameters.

11. An image processing apparatus as claimed in claim 5, wherein the judgement means calculates said conversion parameters within a range of a lower limit value to an upper limit value for said conversion parameters.

12. An image processing apparatus as claimed in claim 6, wherein the judgement means calculates said conversion parameters within a range of a lower limit value to an upper limit value for said conversion parameters.

* * * * *